(12) United States Patent
Shetty et al.

(10) Patent No.: US 8,918,644 B2
(45) Date of Patent: *Dec. 23, 2014

(54) IMPARTING REAL-TIME PRIORITY-BASED NETWORK COMMUNICATIONS IN AN ENCRYPTED COMMUNICATION SESSION

(75) Inventors: Pritham Shetty, Los Altos, CA (US); Asa Whillock, San Francisco, CA (US); Edward Chan, Fremont, CA (US); Srinivas Manapragada, Fremont, CA (US); Matthew Kaufman, Bonny Doon, CA (US); Michael Thornburgh, San Jose, CA (US)

(73) Assignee: Adobe Systems Corporation, San Jose, CA (US)

( * ) Notice: Subject to any disclaimer, the term of this patent is extended or adjusted under 35 U.S.C. 154(b) by 107 days.

This patent is subject to a terminal disclaimer.

(21) Appl. No.: 13/584,484

(22) Filed: Aug. 13, 2012

(65) Prior Publication Data

US 2012/0317416 A1 Dec. 13, 2012

Related U.S. Application Data

(63) Continuation of application No. 13/281,317, filed on Oct. 25, 2011, now Pat. No. 8,245,033, which is a continuation of application No. 12/252,357, filed on Oct. 15, 2008, now Pat. No. 8,051,287.

(51) Int. Cl.
*H04L 29/06* (2006.01)
*H04L 9/32* (2006.01)

(52) U.S. Cl.
CPC .......... *H04L 9/3271* (2013.01); *H04L 63/0869* (2013.01); *H04L 63/06* (2013.01); *H04L 9/3242* (2013.01)
USPC ...................................................... 713/168

(58) Field of Classification Search
CPC ................................ H04L 9/002; H04L 9/08
USPC ........................................................ 713/168
See application file for complete search history.

(56) References Cited

U.S. PATENT DOCUMENTS

| 4,200,770 A | 4/1980 | Hellman et al. |
|---|---|---|
| 5,185,795 A | 2/1993 | Bright |

(Continued)

FOREIGN PATENT DOCUMENTS

| EP | 1054546 | 11/2000 |
|---|---|---|
| EP | 1162530 | 12/2001 |
| WO | WO 03/079608 | 9/2003 |

OTHER PUBLICATIONS

Adkhis, F., Authorized Officer, European Patent Office, in PCT International Application No. PCT/US2008/079886, filed Oct. 14, 2008, International Search Report dated May, 20 2009, 15 pages.

(Continued)

*Primary Examiner* — Mohammad W Reza
(74) *Attorney, Agent, or Firm* — Shok Hardy & Bacon LLP. Intellectual Property Department

(57) ABSTRACT

This specification describes technologies relating to imparting real-time priority-based network communications in an encrypted session. In general, aspects of the subject matter described can be embodied in methods that include establishing, based on cryptographic information in a reserved, random-data portion of a handshake communication, a session, receiving parameter values relating to a sub media stream, included in a header of a network communication, storing the parameter values, obtaining state information and a data payload included in a second network communication, identifying, from the state information, a purpose of the second network communication, and whether a header of the second network communication includes one or more new values corresponding to one or more of the parameters, updating one or more of the stored values based on the one or more new values, and processing the data payload based on the identified purpose and the stored parameter values.

29 Claims, 10 Drawing Sheets

(56) References Cited

U.S. PATENT DOCUMENTS

| | | |
|---|---|---|
| 5,481,610 A | 1/1996 | Doiron et al. |
| 5,541,852 A | 7/1996 | Eyuboglu et al. |
| 5,574,934 A | 11/1996 | Mirashrafi et al. |
| 5,602,831 A | 2/1997 | Gaskill |
| 5,661,665 A | 8/1997 | Glass et al. |
| 5,664,116 A | 9/1997 | Gaytan et al. |
| 5,751,968 A | 5/1998 | Cohen et al. |
| 5,768,527 A | 6/1998 | Zhu et al. |
| 5,805,804 A | 9/1998 | Laursen et al. |
| 5,841,432 A | 11/1998 | Carmel et al. |
| 5,850,481 A | 12/1998 | Rhoads |
| 5,892,915 A | 4/1999 | Duso et al. |
| 5,928,330 A | 7/1999 | Goetz et al. |
| 5,943,422 A | 8/1999 | Van Wie et al. |
| 5,969,763 A | 10/1999 | Sakamoto |
| 6,011,849 A | 1/2000 | Orrin |
| 6,021,391 A | 2/2000 | Shyu |
| 6,037,983 A | 3/2000 | Au et al. |
| 6,044,205 A | 3/2000 | Reed et al. |
| 6,057,832 A | 5/2000 | Lev et al. |
| 6,064,379 A | 5/2000 | DeMoney |
| 6,067,303 A | 5/2000 | Aaker et al. |
| 6,085,252 A | 7/2000 | Zhu et al. |
| 6,112,024 A | 8/2000 | Almond et al. |
| 6,148,334 A | 11/2000 | Imai et al. |
| 6,163,796 A | 12/2000 | Yokomizo |
| 6,202,081 B1 | 3/2001 | Naudus |
| 6,216,157 B1 | 4/2001 | Vishwanath et al. |
| 6,269,394 B1 | 7/2001 | Kenner et al. |
| 6,275,536 B1 | 8/2001 | Chen et al. |
| 6,295,604 B1 | 9/2001 | Callum |
| 6,317,416 B1 | 11/2001 | Giroux et al. |
| 6,329,986 B1 | 12/2001 | Cheng |
| 6,370,272 B1 | 4/2002 | Shimizu |
| 6,389,473 B1 | 5/2002 | Carmel et al. |
| 6,397,230 B1 | 5/2002 | Carmel et al. |
| 6,449,367 B2 | 9/2002 | Van Wie et al. |
| 6,453,355 B1 | 9/2002 | Jones et al. |
| 6,477,580 B1 | 11/2002 | Bowman-Amuah |
| 6,484,257 B1 | 11/2002 | Ellis |
| 6,487,564 B1 | 11/2002 | Asai et al. |
| 6,546,112 B1 | 4/2003 | Rhoads |
| 6,549,934 B1 | 4/2003 | Peterson et al. |
| 6,557,031 B1 | 4/2003 | Mimura et al. |
| 6,574,218 B1 | 6/2003 | Cooklev |
| 6,621,870 B1 | 9/2003 | Gordon et al. |
| 6,631,418 B1 | 10/2003 | Watkins |
| 6,633,244 B2 | 10/2003 | Avery et al. |
| 6,640,303 B1 | 10/2003 | Vu |
| 6,681,327 B1 | 1/2004 | Jardin |
| 6,760,378 B1 | 7/2004 | Conklin |
| 6,763,178 B1 | 7/2004 | Suzuki et al. |
| 6,763,390 B1 | 7/2004 | Kovacevic et al. |
| 6,766,376 B2 | 7/2004 | Price |
| 6,788,686 B1 | 9/2004 | Khotimsky et al. |
| 6,801,947 B1 | 10/2004 | Li |
| 6,806,909 B1 | 10/2004 | Radha et al. |
| 6,823,394 B2 | 11/2004 | Waldvogel et al. |
| 6,847,618 B2 | 1/2005 | Laursen et al. |
| 6,877,010 B2 | 4/2005 | Smith-Semedo et al. |
| 6,879,559 B1 | 4/2005 | Blackmon et al. |
| 6,888,848 B2 | 5/2005 | Beshai et al. |
| 6,898,706 B1 | 5/2005 | Venkatesan et al. |
| 6,912,658 B1 | 6/2005 | Glogau et al. |
| 6,934,389 B2 | 8/2005 | Strasser et al. |
| 6,985,932 B1 | 1/2006 | Glaser et al. |
| 6,990,497 B2 | 1/2006 | O'Rourke et al. |
| 6,992,983 B1 | 1/2006 | Chatterjee |
| 6,999,424 B1 | 2/2006 | Kovacevic et al. |
| 7,003,570 B2 | 2/2006 | Messinger et al. |
| 7,007,163 B2 | 2/2006 | Tardo et al. |
| 7,010,692 B2 | 3/2006 | Jablon |
| 7,039,192 B1 | 5/2006 | Whelan |
| 7,043,633 B1 | 5/2006 | Fink et al. |
| 7,051,200 B1 | 5/2006 | Manferdelli et al. |
| 7,080,041 B2 | 7/2006 | Nagel |
| 7,095,851 B1 | 8/2006 | Scheidt |
| 7,096,359 B2 | 8/2006 | Agrawal et al. |
| 7,111,162 B1 | 9/2006 | Bagepalli et al. |
| 7,130,314 B2 | 10/2006 | Bunn et al. |
| 7,133,922 B1 | 11/2006 | She et al. |
| 7,149,811 B2 | 12/2006 | Wise et al. |
| 7,149,813 B2 | 12/2006 | Flanagin et al. |
| 7,149,892 B2 | 12/2006 | Freed et al. |
| 7,161,939 B2 | 1/2007 | Israel et al. |
| 7,167,560 B2 | 1/2007 | Yu |
| 7,224,703 B2 | 5/2007 | Antal et al. |
| 7,239,703 B2 | 7/2007 | Higurashi et al. |
| 7,246,356 B1 | 7/2007 | Lozben et al. |
| 7,251,832 B2 | 7/2007 | Venters et al. |
| 7,272,658 B1 | 9/2007 | Edelman |
| 7,299,356 B2 | 11/2007 | Mizrah |
| 7,310,353 B1 | 12/2007 | Bourlas et al. |
| 7,324,500 B1 | 1/2008 | Blackmon et al. |
| 7,333,921 B2 | 2/2008 | Taylor et al. |
| 7,372,964 B2 | 5/2008 | Mimura et al. |
| 7,383,289 B2 | 6/2008 | Kraft et al. |
| 7,428,247 B2 | 9/2008 | Bunn et al. |
| 7,433,930 B2 | 10/2008 | Fenizia et al. |
| 7,570,766 B2 | 8/2009 | Mangold et al. |
| 7,577,750 B2 | 8/2009 | Shen et al. |
| 7,583,695 B2 | 9/2009 | Vimpari et al. |
| 7,587,509 B1 | 9/2009 | Edelman et al. |
| 7,590,844 B1 | 9/2009 | Sherman et al. |
| 7,640,435 B2 | 12/2009 | Morten |
| 7,693,186 B2 | 4/2010 | Bunn et al. |
| 7,934,000 B2 | 4/2011 | Chouksey et al. |
| 7,961,878 B2 | 6/2011 | Whillock et al. |
| 8,009,620 B2 | 8/2011 | Zheng et al. |
| 8,051,287 B2 | 11/2011 | Shetty et al. |
| 8,205,076 B1 | 6/2012 | Shetty et al. |
| 8,245,033 B1 | 8/2012 | Shetty et al. |
| 8,284,932 B2 | 10/2012 | Whillock et al. |
| 2001/0004417 A1 | 6/2001 | Narutoshi et al. |
| 2002/0021761 A1 | 2/2002 | Zhang et al. |
| 2002/0025045 A1 | 2/2002 | Raike |
| 2002/0055989 A1 | 5/2002 | Stringer-Calvert et al. |
| 2002/0065926 A1 | 5/2002 | Hackney et al. |
| 2002/0103815 A1 | 8/2002 | Duvillier et al. |
| 2002/0116716 A1 | 8/2002 | Sideman |
| 2003/0005142 A1 | 1/2003 | Elzur et al. |
| 2003/0046431 A1 | 3/2003 | Belleguie |
| 2003/0061369 A1 | 3/2003 | Aksu et al. |
| 2003/0110286 A1 | 6/2003 | Antal et al. |
| 2003/0115268 A1 | 6/2003 | Esposito |
| 2003/0154239 A1 | 8/2003 | Davis et al. |
| 2003/0187993 A1 | 10/2003 | Ribot |
| 2003/0221014 A1 | 11/2003 | Kosiba et al. |
| 2004/0032424 A1 | 2/2004 | Florschuetz |
| 2004/0064725 A1 | 4/2004 | Padmanabhan et al. |
| 2004/0098533 A1 | 5/2004 | Henshaw et al. |
| 2004/0111610 A1 | 6/2004 | Slick et al. |
| 2004/0205555 A1* | 10/2004 | Hind et al. .............. 715/513 |
| 2004/0213291 A1 | 10/2004 | Beshai et al. |
| 2004/0215803 A1 | 10/2004 | Yamada et al. |
| 2005/0050441 A1 | 3/2005 | Kearney |
| 2005/0129243 A1 | 6/2005 | Bousis |
| 2005/0188007 A1 | 8/2005 | Warner et al. |
| 2005/0235145 A1 | 10/2005 | Slick et al. |
| 2006/0136875 A1 | 6/2006 | Thorpe |
| 2006/0161516 A1 | 7/2006 | Clarke et al. |
| 2006/0174134 A1 | 8/2006 | Taylor |
| 2006/0184790 A1 | 8/2006 | Oliveira et al. |
| 2006/0195886 A1 | 8/2006 | Ashley |
| 2006/0209789 A1 | 9/2006 | Gupta et al. |
| 2006/0269058 A1 | 11/2006 | Kessler |
| 2007/0076877 A1 | 4/2007 | Camp et al. |
| 2007/0083467 A1 | 4/2007 | Lindahl et al. |
| 2007/0110237 A1 | 5/2007 | Tehranchi et al. |
| 2007/0127458 A1 | 6/2007 | Small et al. |
| 2007/0220118 A1 | 9/2007 | Loyer |
| 2008/0195865 A1 | 8/2008 | Nikander |
| 2009/0003600 A1 | 1/2009 | Chen et al. |
| 2009/0116646 A1 | 5/2009 | Pippuri |

(56) References Cited

U.S. PATENT DOCUMENTS

| | | | |
|---|---|---|---|
| 2009/0238365 | A1 | 9/2009 | Bardera Bosch et al. |
| 2009/0327510 | A1 | 12/2009 | Edelman et al. |
| 2010/0208655 | A1 | 8/2010 | Kim et al. |
| 2011/0302417 | A1 | 12/2011 | Whillock et al. |

OTHER PUBLICATIONS

*Adobe Systems Incorporation v. Wowza Media Systems, Inc.*, Case No. 4:2011cv02243 filed May 6, 2011, "Defendant-Counterclaim Plaintiff's Invalidity Contentions Under Patent L.R. 3-3", Feb. 2, 2012, 51 pages.
Adobe Systems Incorporated "Adobe Extends Web Video Leadership with H.264 Support", downloaded from the internet at: http://web.archive.org/web/20070823111344/http://www.adobe.com/aboutadobe/pressroom/pressreleases/200708/082107FlashPlayer.html, Aug. 21, 2007, 4 pages.
Adobe Systems Incorporated, "Flash Media Server 3 preview FAQ", downloaded from the internet at: http://www.adobe.com/aboutadobe/pressroom/pressmaterials/fms3/faq/, 5 pages.
Adobe Systems Incorporated, "Solutions and Products", Archived version of Adobe® Flash® Player 10.1 features page, downloaded from the internet at: http://webarchive.nationalarchives.gov.uk/20060715171503/adobe.com/products/flashplayer/features/index.html, Jul. 15, 2006, 4 pages.
Adobe Systems Incorporated, "Adobe Delivers Flash Player 9 with H.264 Video Support", downloaded from the internet at: http://www.adobe.com/aboutadobe/pressroom/pressreleases/200712/120407adobemoviestar.html, Dec. 4, 2007, 4 pages.
Adobe Systems Incorporated, "Adobe Previews Flash Media Server 3 at IBC", downloaded from the internet at: http://www.adobe.com/aboutadobe/pressroom/pressreleases/200709/090607FMS.html, Sep. 6, 2007, 4 pages.
Adobe Systems Incorporated, "Adobe Labs: Flash Player 9 Update", downloaded from the internet at: http://web.archive.org/web/20070827031336/http://labs.adobe.com/technologies/flashplayer9/ 2006, 5 pages.
Adobe Systems Incorporated, "Adobe Labs: Welcome to Adobe Labs", downloaded from the internet at: http://web.archive.org/web/20070831023022/http:/labs.adobe.com/ 2006, 2 pages.
Advantages of On2 VP6 Technology, Oct. 20, 2006, published by On2 Technologies, Inc., 18 pages.
Artz, D., "Digital Steganography: Hiding Data within Data," Los Alamos National Laboratory, IEEE Internet Computing, http://computer.org/internet/ May/Jun. 2001, pp. 75-80.
Ahsan, K., et al., "Practical Data Hiding in TCP/IP," Proc. Workshop on Multimedia Security at ACM Multimedia '02, French Riviera, Dec. 2002, 8 pages.
Archimedes Podule Loaders, downloaded from the internet at: http://www.chiark.greenend.org.uk/~theom/riscos/docs/PodLoader.txt, 1984, 15 pages.
Artz, D., "Digital Steganography: Hiding Data within Data," Los Alamos National Laboratory, IEEE Internet Computing, http://computer.org/internet/, May-Jun. 2001, pp. 75-80.
Bishop, response to USPTO Office Action in U.S. Appl. No. 10/366,646 mailed Feb. 12, 2007 (now US 7272658, issued Sep. 18, 2007), Mar. 12, 2007, 11 pages.
Chapter 6: What is Streaming Media and How does it Work?, Jul. 18, 2007, published by the Internet, <http://service.real.comlhelp/player/plus manual. g2/htrnlfiles/whatisrp .htrn, 13 pages.
Chea, USPTO Office Action in U.S. Appl. No. 10/366,646 mailed Sep. 22, 2006 (now US 7272658, issued Sep. 18, 2007), 10 pages.
Chea, USPTO Office Action in U.S. Appl. No. 10/366,646 mailed Feb. 12, 2007 (now US 7272658, issued Sep. 18, 2007), 2 pages.
Chea, USPTO Notice of Allowance in U.S. Appl. No. 10/366,646 mailed Aug. 2, 2007 (now US 7272658, issued Sep. 18, 2007), 17 pages.
Chea, USPTO Office Action in U.S. Appl. No. 11/841,517 mailed Mar. 13, 2009 (now US 7587509, issued Sep. 8, 2009), 21 pages.
Chea, USPTO Notice of Allowance in U.S. Appl. No. 11/841,517 mailed May 1, 2009 (now US 7587509, issued Sep. 8, 2009), 6 pages.
Chea, USPTO Examiner's Amendment in U.S. Appl. No. 11/841,517 mailed Aug. 19, 2009 (now US 7587509, issued Sep. 8, 2009), 3 pages.
Chea, USPTO Office Action in co-pending U.S. Appl. No. 12/554,775 mailed Nov. 26, 2010 (11 pages), to be published by the USPTO with the file history of this application.
Chea, USPTO Final Office Action in co-pending U.S. Appl. No. 12/554,775 mailed May 16, 2011 (8 pages), to be published by the USPTO with the file history of this application.
Cole, E., "Hiding in Plain Sight: Steganography and the Art of Covert Communication," ISBN-10: 0471444499, Wiley Publishing, Inc., 2003, 363 pages.
"Common Multimedia Formats and Extentions"., Jul. 18, 2007, published by SorensonMedia, , <http://www.sorensontech.comllearn/video_file_format.php>, 2 pages.
Huang, D., et al., "A double authentication scheme to detect impersonation attack in link state routing protocols," Proc. of IEEE International Conference on Communications (ICC2003), Anchorage, Alaska, May 2003 pp. 1723-1727.
ISMA Internet Streaming Media Alliance Implementation Specification: ISMA Encryption and Authentication Specification v.1.1., AREA/Task Force: DRM, Sep. 15, 2006, 64 pages.
Kawaguchi, E., et al. "A Model of Anonymous Covert Mailing System Using Steganographic Scheme", Information Modeling and Knowledge Bases XIV ISBN-10: 1586033182, 2003, pp. 81-85.
Kim et al., "MPEG-compliant joint source/channel coding using discrete cosine transform and substream scheduling for visual communication over packet networks", Journal of Electronic Imaging vol. 10(1), Jan. 2001, pp. 329-338.
Kundur, D., et al., "Practical Internet Steganography: Data Hiding in IP," Proc. Texas Workshop on Security of Information Systems, College Station, Texas, Apr. 2003, 5 pages.
Linder, Nora, Authorized Officer, The International Bureau of WIPO, International Application No. PCT/US2008/079886 filed Oct. 14, 2008, International Preliminary Report dated Apr. 29, 2010, 8 pages.
Lucena, N., et al., "Syntax and Semantics-Preserving Application-Layer Protocol Steganography" Information Hiding : $6^{th}$ International Workshop IH 2004, Toronto, Canada, May 2004, 16 pages.
Lucena, N., et al., "Syntax and Semantics-Preserving Application-Layer Protocol Steganography," Information Hiding Lecture Notes in Computer Science, 2005, vol. 3200/2005, 229:230, DOI: 10.1007/978-3-540-30114-1_12, Feb. 14, 2005.
Meaney, response to USPTO Office Action in U.S. Appl. No. 10/366,646 mailed Sep. 22, 2006 (now US 7272658, issued Sep. 18, 2007), Dec. 12, 2006, 17 pages.
Meaney, response to USPTO Office Action in U.S. Appl. No. 11/841,517 mailed Mar. 13, 2009 (now US 7587509, issued Sep. 8, 2009), Mar. 24, 2009, 13 pages.
Murdoch, S., et al., "Embedding Covert Channels into TCP/IP," Draft for Information Hiding Workshop 2005 proceedings, revision 1159, Jul. 29, 2005, 15 pages.
Peuker, "An Object-Oriented Architecture for the Real-Time Transmission of Multimedia Data Streams", downloaded from the internet at: http://scholar.googleusercontent.com/scholar?q=cache:AVOaWj1F-bMJ:scholar.google.com . . . on Sep. 6, 2011, 60 pages.
PHPBuilder.com, "Mar. 31, 2006, 06:36 AM comment by n_wattam to the post How to hide encryption key?" downloaded from the internet at: http://www.phpbuilder.com/board/archive/index.php/t-10320464.html , Mar. 31, 2006, 3 pages.
Quicktime Streaming Server Administrator's Guide. 2002, published by Apple Computer, Inc. 2002, 84 pages.
"Real Time Messaging Protocol Chunk Stream", Apr. 2009, Adobe Systems Incorporated, 70 pages.
Salowey, J., et al., "RFC 4507, Transport Layer Security (TLS) Session Resumption without Server-Side State" The Internet Engineering Task Force (IETF), May 2006, 18 pages.
Salowey et al., "Transport Layer Security (TLS) Session Resumption Without Server-Side State", IETF Standard-Working-Draft, Internet Engineering Task Force, IETF, CH, Jun. 11, 2007, Abstract, p. 4, line 4, p. 9, line 23, 15 pages.

(56) References Cited

OTHER PUBLICATIONS

Schulzrinne, H. et al. "Real Time Streaming Protocol (RTSP)", Apr. 1998, published by the Internet Society, 86 pages.
Shamir, A. et al., "Playing hide and seek with stored keys," Financial Cryptography Lecture Notes in Computer Science 1999, vol. 1648/1999, 118-124, DOI: 10.1007/3-540-48390-X_9, Sep. 22, 1998.
U.S. Patent Office, U.S. Appl. No. 11/872,661, filed Oct. 15, 2007, in Office Action, mailed Nov. 16, 2010, 24 pages.
Szczypiorski, K., "Steganography in TCP/IP Networks. State of the Art and a Proposal of a New System—HICCUPS", Warsaw University of Technology, Poland Institute of Telecommunications, Warsaw, Poland, Nov. 4, 2003, 46 pages.
Trappe, W., et al., "Key distribution for secure multimedia multicasts via data embedding," Acoustics, Speech, and Signal Processing, 2001, Proceedings (ICASSP '01), May 2001, vol. 3, pp. 1449-1452.
"Truemotion VP7 Video Codec", Jan. 10, 2005, published by On2 Technologies, Inc., 13 pages.
Vacar, response to USPTO Notice of Allowance in U.S. Appl. No. 11/841,517 mailed May 1, 2009 (now US 7587509, issued Sep. 8, 2009), Aug. 3, 2009, 4 pages.
Vacar, response to USPTO Office Action in co-pending U.S. Appl. No. 12/554,775 mailed Nov. 26, 2010, dated Feb. 28, 2011 (17 pages), to be published by the USPTO with the file history of this application.
Vacar, response to USPTO Final Office Action in co-pending U.S. Appl. No. 12/554,775 mailed May 16, 2011, dated Jul. 18, 2011 (26 pages), to be published by the USPTO with the file history of this application.
Viguet, Supplemental Response filed in U.S. Appl. No. 10/366,646 filed May 15, 2007 (now US 7272658, issued Sep. 18, 2007), 16 pages.
Zander, S., et al., "A Survey of Covert Channels and Countermeasures in Computer Network Protocols," IEEE Communications Surveys & Tutorials, 3rd Quarter 2007, vol. 9, No. 3, pp. 44-57.
Adobe, Archived Jul. 15, 2006 version of Adobe® Flash® Player 10.1 feature page: http://webarchive.nationalarchives.gov.uk/20060715171503/adobe.com/products/flashplayer/features/index.html, 24 pages.
Albrightson et al., "EIGRAP—A Fast Routing Protocol Based on Distance Vectors," Cisco Systems and University of California, Santa Cruz, 1994, 13 pages.
Anderson, "Stretching the Limits of Steganography" Cambridge University, United Kingdom, 1996, 10 pages.
Appenzeller et al., "Minimal-Overhead IP Security using Identity Based Encryption," Stanford University, California, 2002, 12 pages.
Aura, "Practical Invisibility in Digital Communication," Helsinki University of Technology, Finland, 1996, 14 pages.
Barham et al., "Techniques for Lightweight Concealment and Authentication in IP Networks," Intel Research Berkeley, California, Jul. 2002, 12 pages.
Baugher et al., "The secure real-time transport protocol," [internet draft], Internet Engineering Task Force, 2003, 54 pages.
Bhaskar et al., "Comparison of WWW security Protocols: Secure Sockets Layer (SSL), Transport Layer Security (TLS), & Secure HTTP (S-HTTP)" 2000 (est.), 26 pages.
Birk, "Deterministic Load-Balancing Schemes for Disk-Based Video-on-Demand Storage Servers," Fourteenth IEEE Symposium on Mass Storage Systems, *IEEE*, 1995, pp. 17-25.
Bishop, *Computer Security: Art and Science*, Westford, MA: Addison Wesley Professional 2003, 1084 pages.
Chapman and Davida, "Plausible Deniability Using Automated Linguistic Stegonagraphy," Omni Tech Corporation and University of Wisconsin, Milwaukee, 2002, 13 pages.
Cole, *Hiding in Plain Sight: Steganography and the Art of Covert Communication*, Chapters 2, 3, and 7, Wiley Publishing, Inc., Indianapolis, Indiana, 2003, 95 pages.
Dawson, et al., "Evaluation of RC4 Stream Cipher" Queensland University of Technology, Australia, 2002, 53 pages.
Edit, "Security in Web Applications" [masters thesis] Vrije Universiteit Brussel, Belgium, 2000, 55 pages.

Desmedt, "Unconditionally Secure Authentication Schemes and Practical and Theoretical Consequences," University of New Mexico, 1998, 16 pages.
Dierks et al., "The TLS Protocol Version 1.0" (RFC 2246) The Internet Society, 1999, 81 pages.
Diffie and Hellman, "Exhaustive Crytanalysis of the NBS Data Encryption Standard," *Computer*, 10(6):74-84, 1977.
Drakos, "An Object-Oriented Architecture for the Real-Time Transmission of Multimedia Data Streams" Computer Based Learning Unit, University of Leeds, Copyright 1993, 1994. Translation initiated by Thomas Peuker (translated in 1997). Full text English translation online at http://www4.cs.fau.de/Projects/JRTP/pmt/book.html.
Durant, "CS384: Design of Operating Systems Term Paper—Embedded Real-Time System Considerations" Milwaukee School of Engineering, Wisconsin, 1998, 19 pages.
Dykstra, "A framework for network covert channel detection," [masters thesis], Iowa State University, 2004, 43 pages.
Estrada et al., "An Application Layer Covert Channel: Information Hiding with Chaffing," Massachusetts Institute of Technology, 1999, 15 pages.
Faulk and Pernas, "On Synchronization in Hard-Real-Time Systems," *Communications of the ACM*, 31(3):274-287, 1988.
Freier et al., "The SSL Protocol, Version 3.0," Internet Engineering Task Force, 1996, 62 pages.
Giffin et al., "Covert Messaging through TCP Timestamps," *Privacy Enhancing Technologies*, pp. 194-208, Springer-Verlag Berlin Heidelberg, Germany, 2003.
Goh et al., "The design and implementation of protocol-based hidden key recovery," Stanford University, California and HP Labs, *LNCS* 2851, pp. 165-179, 2003, 15 pages.
Hamar, "Non-standard alternatives of communication in TCP/IP networks," Slovak University of Technology, Slovakia, 2006, 8 pages.
Handel and Sandford II, "Hiding Data in the OSI Network Model" Weapon Design Technology Group, New Mexico, 1996, 16 pages.
Harkins and Carrel, "The Internet key exchange (IKE)," RFC 2409, The Internet Society, 1998, 42 pages.
Hollmann et al., "Protection of software algorithms executed on secure modules," *Future Generation Computer Systems*, 13: 55-63, 1997
Horman a.k.a. Horms, "SSL and TLS: An Overview of Secure Communications Protocol," Presented at the Security Mini-Conference in Canberra, Australia, Apr. 2005, 26 pages.
"Integrate HMAC Capable Token into User Authentication Mechanism and Public Key Infrastructure," *SANS Institute Information Security Reading Room*, 2001, 10 pages.
Judge, "Steganography: Past, Present, and Future," *SANS Institute Information Security Reading Room*, 2001, 29 pages.
Kaufman et al., *Network Security: Private Communication in a Public World*, PTR Prentice Hall, Englewood Cliffs, NJ, 1995, 752 pages.
Kent and Atkinson, "IP authentication header," RFC 2402, The Internet Society, 1998, 23 pages.
Kent and Linn, "Privacy Enhancement for Internet Electronic Mail: Part II: Certificate-Based Key Management" (RFC 1114), IAB Privacy Task Force, 1989, 26 pages.
Kirovski et al., "Enabling Trusted Software Integrity", *ASPLOS X* (Oct. 2002), 13 pages.
Knuth, *The art of computer programming vol. I: Fundamental Algorithms*, second edition, Addison-Wesley, Reading, Mass, 1973, 634 pages.
Lim, "Specification and Analysis of CRYPTON Version 1.0" Future Systems, Inc., 1999, 2001, 25 pages.
Linn, "Privacy Enhancement for Internet Electronic Mail: Part I—Message Encipherment and Authentication Procedures" (RFC 1113), IAB Privacy Task Force, 1989, 35 pages.
Linn, "Privacy Enhancement for Internet Electronic Mail: Part III—Algorithms, Modes, and Identifiers" (RFC 1115), IAB Task Force, 1989, 9 pages.
Lucena et al., "Semantics-Preserving Application-Layer Protocol Steganography," Syracuse University, Syracuse, NY, 13 pages, 2005.
MacDermid, "Considerations in the design of stegtunnel—a method of passing hidden data in TCP/IP headers," http://www.synacklabs.net/projects/stegtunnel/ and http://www.synacklabs.net/OOB/

(56) References Cited

OTHER PUBLICATIONS stegtunnel.html (Available on or before May 30, 2003,) downloaded from the Internet on Dec. 3, 2012, 4 pages.
Maughan et al., "Internet security association and key management protocol (ISAKMP)," RFC 2408, The Internet Society, 1998, 87 pages.
Menezes et al., *Handbook of Applied Cryptography*, CRC Press, Boca Raton, 1997, 780 pages.
Namprempre, "Simultaneously Ensuring Privacy and Authenticity in Digital Communication" [dissertation] University of California, San Diego 2002, 170 pages.
Owens, "A Discussion of Covert Channels and Steganography," *SANS Institute Information Security Reading Room*, 2002, 18 pages.
Piper, "The Internet IP Security Domain of Interpretation for ISAKMP," RFC 2407, The Internet Society, 1998, 33 pages.
Popa, "An Analysis of Steganographic Techniques" The "Politehnica" University of Timisoara, Romania, 1998, 65 pages.
Purcell, "Using Flash Media Server 2.0," The 2005 Macromedia Conference, 2005, 38 slides.
Rosenberg et al., "Session Initiation Protocol (SIP): Locating SIP Servers" (RFC 3261) The Internet Society, 2002, 18 pages.
Rowland, "Covert Channels in the TCP/IP Protocol Suite," *First Monday*, vol. 2, No. 5, 1997, 33 pages.
Savateeve, "Design of the steganography system based on the version 4 Internet protocol," Conference on Control and Communications SIBCON-2005, 2005, 14 pages.
Schneier, *Applied Cryptography*, second edition, (John Wiley (1996), 758 pages.
Sharp, "An Implementation of Key-Based Digital Signal Steganography" *Lecture Notes in Computer Science* vol. 2137, 2001, pp. 13-26, 15 pages.
Smeets and Koot, "Research Report; Covert Channels," Research Report for RP1, University of Amsterdam, 2006, 43 pages.
Stallings, *Cryptography and Network Security: Principles and Practice*, second edition, Prentice Hall (Upper Saddle River, NJ,2003), 999 pages.
Stinson, *Cryptography: Theory and Practice*, third edition, Chapman & Hall/CRC (Boca Raton, 2006), 597 pages.
Svensson, "Upgrading the SSL protocol to TLS in the Roxen WebServer," Institutionen för Systemteknik, Linköpings Universitet, Sweden, 2002, 57 pages.
Tanenbaum, *Computer Networks*, fourth edition, Prentice Hall (Upper Saddle River, NJ, 2003), 891 pages.
Toth, "Low level AS3—Establishing an RTMP connection with Socket and ByteArray," 2007, 10 pages.
Trappe, "Key distribution for secure multimedia multicasts via data embedding," 2001 IEEE International Conference on Acoustics, Speech, and Signal Processing Proceedings vol. 3, pp. 1449-1452, 2001, 4 pages.
Treese, "Security and the World Wide Web," [panel] 1997 Symposium on Network and Distributed System Security, p. 109, 1997, 1 page.
Voydock and Kent, "Security Mechanisms in High-Level Network Protocols," *Computing Surveys*, 15(2):135-171, 1983, 37 pages.
Westfeld and Pfitzmann, "Attacks on Steganographic Systems: Breaking the Steganographic Utilities EzStego, Jsteg, Steganos, and S-Tools-and Some Lessons Learned" Dresden University of Technology, Germany, 2000, 16 pages.
Westfeld and Pfitzmann, "Attacks on Steganographic Systems: Breaking the Steganographic Utilities EzStego, Jsteg, Steganos, and S-Tools-and Some Lessons Learned," Information Hiding, Third International Workshop, Germany, 1999, 38 slides.

Westfeld, "F5—A Steganographic Algorithm—High Capacity Despite Better Steganalysis," 4th International Workshop on Information Hiding, Pennsylvania, (2001), 14 pages.
Wikipedia, "Protected Streaming." Retrieved from the internet: http://en.wikipedia.org/wiki/Protected_Streaming. Retrieved on Nov. 28, 2012, 2 pages.
Yung, "A Secure and Useful 'Keyless Cryptosystem'," Columbia University, New York, 1985, 7 pages.
Zandy and Miller, "Reliable Network Connections," MobiCom 2002, Georgia, 2002, 12 pages.
*Adobe Sys. Inc.* v. *Wowza Media Sys. Inc.*, No. CV-11-02243, (N.D. Cal. filed May 6, 2011), Declaration of Milan Toth, 17 pages.
*Adobe Sys. Inc.* v. *Wowza Media Sys. Inc.*, No. CV-11-02243, (N.D. Cal. filed May 6, 2011), Second Amended Complaint and accompanying documents, filed Dec. 13, 2011, 136 pages.
Declaration of Alyssa Liang in the Inter Partes Review of Patent 8,051,287, Trial No. IPR2013-00054, filed on Nov. 17, 2012, 8 pages.
Declaration of Dr. Alan T. Sherman in the Inter Partes Review of Patent 8,051,287, Trial No. IPR2013-00054, filed on Nov. 17, 2012, 103 pages.
Defendant counterclaim invalidity contentions.
Petition Filing receipt from Petition for Inter Partes Review of Patent 8,051,287, Trial No. IPR2013-00054, filed on Nov. 17, 2012, 1 page.
Petitioner Coffee Cup Partners, Inc.'s Power of Attorney in Inter Partes Review of Patent 8,051,287, Trial No. IPR2013-00054, filed on Nov. 17, 2012, 3 pages.
Petitioner Wowza Media Systems, LLC's Power of Attorney in Inter Partes Review of Patent 8,051,287, Trial No. IPR2013-00054, filed on Nov. 17, 2012, 4 pages.
Petiton for Inter Partes Review of Patent 8,051,287, Trial No. IPR2013-00054, filed on Nov. 17, 2012, 69 pages.
Adobe, "Real Time Messaging Protocol (RTMP) Message Formats," draft-rtmp-01.txt (Jun. 2009).
Adobe, RTMP Command Messages, draft-rtmpcommandmessages-01.txt (Jun. 2009).
Adobe's supplemental response and objections to interrogatory 29.
Alan Theodore Sherman, "Curriculum Vitae," Nov. 10, 2012, 38 pages.
Examination guidelines for determining obviousness under 35 U.S.C 103 in view of the Supreme Court Decision in *KSR International Co.* v. *Teleflex Inc.*
Joint claim construction statement.
*KSR Intern. Co.* v. *Teleflex*, 550 U.S. 398 (2007).
Real Time Messaging Protocol Chunk Stream, Apr. 2009, Adobe Systems Incorporated.
RTMP Specification License (Apr. 2009).
RTMPe, http://lkcl.net/rtmp/RTMPE.txt [accessed on Sep. 22, 2012] [A "clean-room" specification of the RTMP "encryption" scheme.].
Wowza's amended patent L.R. 3-3 Invalidity contentions with appendices.
Prosecution history for U.S. Appl. No. 11/872,661, filed on Oct. 15, 2007, now patent No. 7,961,878.
Prosecution history for U.S. Appl. No. 12/252,357, filed on Oct. 15, 2008, now patent No. 8,051,287.
Prosecution history for U.S. Appl. No. 13/158,221, filed on Jun. 10, 2011, now published 2011/0302417.
Prosecution history for U.S. Appl. No. 13/281,317, filed on Oct. 25, 2011, now 8,245,033.
Prosecution history for U.S. Appl. No. 13/304,304, filed on Nov. 23, 2011, now 8,284,932.
Prosecution history for U.S. Appl. No. 13/304,308, filed on Nov. 24, 2011, now 8,205,076.

* cited by examiner

IMPARTING REAL-TIME PRIORITY-BASED NETWORK COMMUNICATIONS IN AN ENCRYPTED COMMUNICATION SESSION

PRIORITY CLAIM

This patent document is a continuation, and claims the benefits of priority under 35 USC 120, of U.S. application Ser. No. 13/281,317, filed Oct. 25, 2011, which is a continuation of U.S. application Ser. No. 12/252,357, filed Oct. 15, 2008, incorporated herein by reference in their entirety.

BACKGROUND

The present disclosure relates to imparting real-time priority-based network communications in an encrypted communication session.

A computer network is a collection of processing nodes coupled together with wired and/or wireless communication links. A computer network can be a single network or a collection of networks (e.g., an internetwork), and can use multiple networking protocols, including internetworking protocols (e.g., Internet Protocol (IP)). These protocols define the manner in which information is prepared for transmission through the network, and typically involve breaking data into segments generically known as packets (e.g., IP packets, ATM (Asynchronous Transfer Mode) cells) for transmission. These networking protocols are typically organized by a network architecture having multiple layers, where a layer provides communication services to the layer above it. The protocols can include shared-line protocols such as in Ethernet networks, connection-oriented switching protocols such as in ATM networks, and/or connectionless packet-switched protocols such as in IP.

Many computer networks use connectionless packet-switched protocols (e.g., IP). Packets are routed separately and can thus take different paths through the network. Various protocols have been built on top of connectionless packet-switched protocols, such as IP, to provide connection based communications over the underlying connectionless protocol. For example, Transmission Control Protocol (TCP), of the TCP/Internet Protocol (IP) protocol stack, sets up a connection at both ends of a communication and attaches a header to the packets that contains the source and destination ports as well as the sequence number of the packet and other administrative information. The destination typically receives a number of TCP packets before sending an acknowledgement to the source. If the acknowledgment fails, the source will generally presume the packets were lost and retransmit those packets. This process ensures reliable delivery.

Another protocol, UDP is connectionless and unreliable, meaning that the protocol does not establish a connection at both ends and does not include a resource for resending lost packets. Real-time Transport Protocol (RTP) operates as a thin layer on top of UDP to create a generalized multipurpose real-time transport protocol. RTP provides support for applications with real-time properties including reconstruction, loss detection, security, and content identification without reliability-induced delays associated with TCP. Real-Time Control Protocol (RTCP) works in conjunction with RTP to provide control support to an application for maintaining an RTP session.

The interactions of various aspects of networks can be complex. Many applications use RTP for transporting media streams. RTP is built over UDP, which generally has no fixed ports associated with it. Firewalls can prevent unauthorized and/or hostile access to a computer system or network. As such, firewalls are generally configured with strict rules specifying static ports through which desired and/or authorized data traffic can pass, while blocking undesirable data. There is no guarantee that a port associated with an incoming RTP/UDP stream will be allowed through the firewall. In addition, NAT devices, which can allow a network to support many more clients than it has fixed IP addresses, are used to translate an IP address used within one network to a different IP address known within another network.

SUMMARY

This specification describes technologies relating to imparting real-time priority-based network communications in an encrypted communication session. In general, one aspect of the subject matter described in this specification can be embodied in a method that includes establishing, based at least in part on cryptographic information in a pre-defined portion of a handshake network communication, a communication session to communicate a media stream, where the pre-defined portion of the handshake network communication is reserved for random data, receiving through the communication session, as part of the media stream, values of parameters relating to a sub media stream, included in a first header portion of a first real-time, priority-based network communication, storing the values of the parameters, obtaining through the communication session, as part of the media stream, state information included in a control portion of a second real-time, priority-based network communication and a data payload included in the second network communication, identifying, from the state information, a purpose of the second network communication in relation to the media stream, and whether a second header portion of the second network communication includes one or more new values corresponding to one or more of the parameters, updating, when the second header portion includes the one or more new values, one or more of the stored values based at least in part on the one or more new values, and processing the data payload based at least in part on the identified purpose and the stored values of the parameters.

In addition, another aspect of the described subject matter can be embodied in a method, where the sub media stream is a first sub media stream, that includes receiving through the encrypted communication session, as part of the media stream, real-time, priority-based network communications associated with a second sub media stream, where the network communications include state information and data payloads, decrypting the data payloads based at least in part on the cryptographic information, assembling a playable portion of the second sub media stream based at least in part on state information and the decrypted data payloads, and playing the assembled portion of the second sub media stream relative to a media type indicated by at least one of the stored values of the parameters. The first and second sub media streams can be the same sub media stream in some embodiments (e.g., both the video portion of a media stream) while in others the sub media streams are distinct (e.g., video and audio portions, respectively, of a media stream). Another aspect of the described subject matter can be embodied in a method that includes turning on or off a feature of a program operating in relation to the communication session based at least in part on the establishing of the communication session. Other embodiments of these aspects include corresponding systems, apparatuses, and computer program products.

These and other embodiments can optionally include one or more of the following features. Identifying the purpose can include identifying the purpose from a set of possible purposes including beginning a new sub media stream, the second header portion including sub media stream values corresponding to the parameters, indicating a new media type, the second header portion including the one or more values corresponding to fewer than all of the parameters, providing a new time, the second header portion including one new value corresponding to one of the parameters, and continuing the sub media stream, the second header portion not including new parameter values.

Establishing the communication session can include generating, using an incoming data portion from the handshake network communication, a responsive handshake network communication, including an outgoing data portion where the outgoing data portion includes at least one of random data and cryptographic information, and the incoming data portion includes at least one of random data and cryptographic information in the handshake network communication, communicating the generated responsive handshake network communication, receiving a second handshake network communication in response to the communicated responsive handshake network communication, and authenticating the second handshake network communication based on the outgoing data portion in the communicated responsive handshake network communication. In addition, establishing the communication session can include establishing a cryptographic key based at least in part on the cryptographic information, and initiating the communication session as an encrypted communication session based at least in part on the cryptographic key.

The described subject matter can also be embodied in a method that includes establishing, based at least in part on cryptographic information in a pre-defined portion of a handshake network communication, a communication session to communicate a media stream, where the pre-defined portion of the handshake network communication is reserved for random data and the media stream includes sub media streams, associating priority values with the sub media streams, generating a total priority value based on the priority values, calculating desired transmission proportions corresponding to the sub media streams based on the priority values and the total priority value, communicating a first set of real-time priority based network communications over the sub media streams, assessing sub media stream counts corresponding to the sub media streams based on the first set of network communications communicated in the sub media streams, summing a total count based on the sub media stream counts, determining actual transmission proportions corresponding to the sub media streams based on the sub media stream counts and the total count, figuring ratios corresponding to the sub media streams based on the desired transmission proportions and the actual transmission proportions, and storing the figured ratios. In addition, another aspect of the described subject matter can be embodied in a method that includes selecting a low-ratio sub media stream corresponding to a lowest of the ratios, queuing a second set of network communications to be communicated over the sub media streams, picking a low-ratio sub media stream network communication, associated with the low-ratio sub media stream, from the queued second set of network communications, and communicating the low-ratio sub media stream network communication over the low-ratio sub media stream.

According to another aspect, the described subject matter can also be embodied in a system including a server, programmed to establish encrypted sessions over a network with a client using a session startup handshake including a handshake network communication including a pre-defined portion reserved for random data, and the client, programmed to establish encrypted sessions with the server using the session startup handshake including cryptographic information in the pre-defined portion of the handshake network communication, where the server and the client are programmed to perform operations including establishing, based at least in part on the cryptographic information, an encrypted communication session to communicate a media stream, receiving through the communication session, as part of the media stream, values of parameters relating to a sub media stream, included in a first header portion of a first real-time, priority-based network communication, storing the values of the parameters, obtaining through the communication session, as part of the media stream, state information included in a control portion of a second real-time, priority-based network communication and a data payload included in the second network communication, identifying, from the state information, a purpose of the second network communication in relation to the media stream, and whether a second header portion of the second network communication includes one or more new values corresponding to one or more of the parameters, updating, when the second header portion includes the one or more new values, one or more of the stored values based at least in part on the one or more new values, and processing the data payload based at least in part on the identified purpose and the stored values of the parameters. The client can be a mobile device (such as a mobile phone, game machine, personal digital assistant, and laptop computer) and a stationary device (such as a workstation, desktop computer, and super computer). The operations can include the various operations of the method(s) described.

In another aspect, the described subject matter can also be embodied in a method including dividing sub media streams, making up media streams, into network communications, assigning states to the network communications representative of information regarding the associated sub media streams and the associated media streams, writing the states into headers of the network communications, queuing the network communications for transmission, and transmitting some of the network communications according to a scheduling process. Another aspect of the described subject matter can be embodied in a method that includes receiving the transmitted network communications, translating the states associated with the network communications into information regarding the associated sub media streams and the associated media streams, and reassembling the network communications into the associated sub media streams for replay of the media streams. In addition, an aspect can be embodied in a method that includes assigning a priority to each sub media stream, totaling a priority for each media stream, calculating a desired transmission proportion for each sub media stream using the assigned priority and the totaled priority, counting a sub-total of network communications transmitted per the sub media stream during a preset period, counting a total number of network communications transmitted during the preset period, calculating an actual transmission proportion for each sub media stream using the sub-total and the total, calculating a ratio between the desired transmission proportion and the actual transmission proportion, determining a sub media stream having a lowest ratio, checking a queue of the network communications for a network communication associated with the determined sub media stream, and transmitting the network communication associated with the determined sub media stream when found in the queue.

These and other embodiments can optionally include one or more of the following features. The states can indicate possible purposes of a corresponding network communication, and the possible purposes can include a new stream network communication associated with a new media message sub media stream where the new stream network communication includes new parameters in a corresponding header and has no parameters from a previous header, a new media network communication associated with a new media message sub media stream where the new media network communication has new parameters in a corresponding header and has at least one other parameter from a previous header, a new time network communication associated with the new media message sub media streams where the new time network communication has at least one new parameter in a corresponding header and uses other parameters from a previous header, and a continuation network communication having no new parameters in a corresponding header and has parameters from a previous header. Dividing can include maintaining a user-definable maximum payload size for the network communications. Assigning can include assigning a unique network communication identification parameter for associating the network communication with its sub media stream, and the unique network communication identification parameter can be smaller than a label associated with the sub media stream. Parameters can include one or more of a stream ID parameter, a length parameter, a media type parameter, and a time delta parameter. Queuing the network communications can include according to a media type of the network communication, where the media type includes is one of an audio format network communication, a video format network communication, and a data format network communication. The scheduling process can interleave the audio format network communications, the video format network communications, and the data format network communications according to an interleaving process. The scheduling process can include determining a sub media stream having a lowest ratio, checking the queue of the network communications for a network communication associated with the determined sub media stream, and transmitting the network communication associated with the determined sub media stream when found in the queue.

Another aspect of the subject matter described in this specification can be embodied in a method that includes identifying a location in a pre-defined portion of a network communication to be sent in a client-server environment, wherein the pre-defined portion of the network communication is reserved for random data, inserting cryptographic information into the pre-defined portion of the network communication at the location, and sending the network communication in the client-server environment to facilitate modifying interactions in the client-server environment based at least in part on a result of processing of the cryptographic information. In addition, another aspect of the described subject matter can be embodied in a method that includes receiving cryptographic information inserted into a pre-defined portion of a network communication in a client-server environment, wherein the pre-defined portion of the network communication is reserved for random data, identifying a location of the cryptographic information in the pre-defined portion of the network communication, processing the cryptographic information, and modifying interactions in the client-server environment based at least in part on a result of the processing of the cryptographic information. Other embodiments of these aspects include corresponding systems, apparatus, and computer program products.

These and other embodiments can optionally include one or more of the following features. Identifying the location can include using at least part of the network communication to determine the location. The pre-defined portion can include the random data, and using at least part of the network communication to determine the location can include retrieving a portion of the random data, and determining an index into the pre-defined portion of the network communication based on the retrieved portion of the random data. Moreover, using at least part of the network communication to determine the location can include retrieving multiple different portions of the random data and determining multiple different indices into the pre-defined portion of the network communication based on the different portions of the random data.

Processing the cryptographic information can include establishing a cryptographic key, and modifying interactions in the client-server environment can include initiating an encrypted session using the cryptographic key. In addition, processing the cryptographic information can include authenticating the network communication, and modifying interactions in the client-server environment can include turning on or off a feature of a program operating in the client-server environment.

Particular embodiments of the subject matter described in this specification can be implemented to realize one or more of the following advantages. Communication sessions can be established in which information providers (e.g., media stream distributors) are better able to ensure that consumers of the information comply with the terms of the information transfer. For example, advertising-based providers can advantageously assure that client applications used to access communication sessions include required advertising.

In addition, network communications corresponding to a communication session can be resistant to snooping by those not directly involved in the session. For example, a client can be a software application running in a browser while a remote server can communicate with the client over a network. Embodiments can avoid a user of the client or anyone intercepting the session traffic on the network from being able to interpret or use the communications without using the specific client to which the communication is directed.

In addition, embodiments can advantageously authenticate communication session participants. For example, so that both the client and server know the identity of the other. Knowing the identity can include assurance that a particular person is using the client or that a specific client or client type is being used. Also, the method can allow a server to detect that a given client is legitimate. Being legitimate can include adhering to communication session protocols or being an authorized client implementation.

In addition, embodiments can ensure that when network communications are altered during transmission, the alteration is detected. For example, a server can send a network communication to a client. An intercepting party can alter the network communication (e.g., inserting spam) and then pass the communication to the client. Upon receipt, the client can detect the alteration, thus avoiding undesirable exposure to spam, phishing attacks, viruses, or other malicious or benign alterations.

In addition, embodiments can overcome the often considerable complexities of balancing the demanding nature of streaming media with security, system administration and computer performance issues. Embodiments can allow each area to work together to permit a feasible, scalable and practical implementation. Embodiments can also advantageously provide backwards compatibility with existing non-encrypted, non-authenticated session establishment protocols.

Encrypted sessions can be established using a method that reduces the risk of reverse engineering. Credentials can be established using the method, which credentials can be used to start an encrypted session, or to verify various other pieces of information. The method can resist reverse engineering since the credentials can be, in essence, hidden in plain sight within data that has been used for bandwidth detection. Moreover, the data (with cryptographic information hidden therein) can still be used for other purposes, such as for bandwidth detection or for holding other information.

Other embodiments can be implemented to realize advantages from breaking media streams into smaller network communications such as smooth delivery of each of the sub media streams and smooth playback of the entire stream (e.g., allowing small but more time-sensitive audio messages to be interleaved with much larger but less time-sensitive video messages so that the overall stream can be played back in a pleasing manner).

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
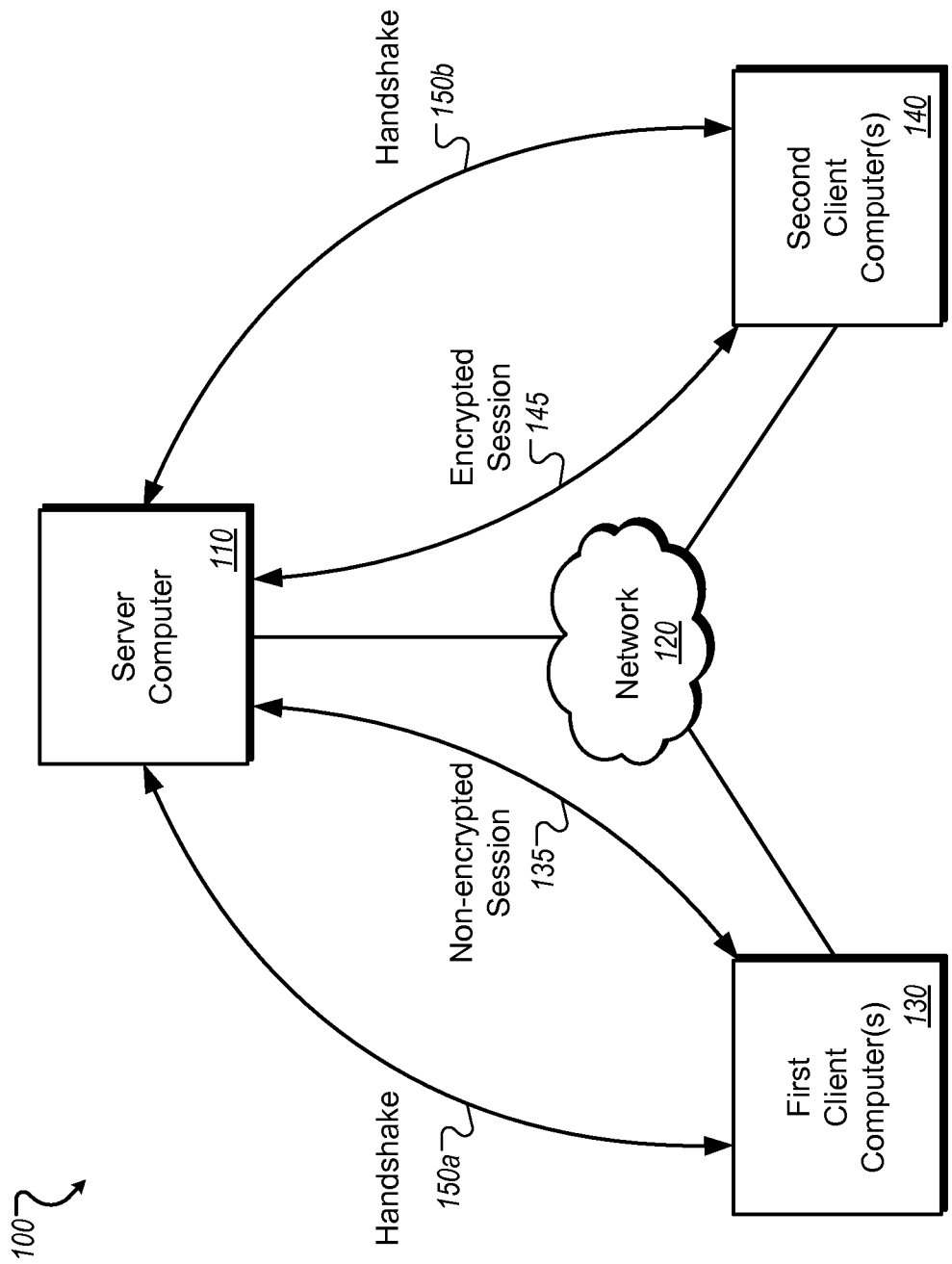
FIG. 1 shows an example network environment in which real-time, priority-based communications are imparted over an encrypted communication session.

FIG. 1 shows an example network environment 100 in which real-time, priority-based communications are imparted over an encrypted communication session. A communication session includes a series of related network communications, which may or may not be encrypted, transmitted over a network (e.g., the Internet). The communication session can be carried over a previously established network connection. For example, a TCP connection can be established, followed by a handshake 150 to establish an encrypted communication session. The communication session can also be an RTCP or RTP-based session or other form of connection-based or connectionless network communication.

The network environment 100 can support both encrypted and non-encrypted sessions, both of which can include the use of a handshake 150, which can include authentication and other communication protocols. Cryptographic information can be included in a previously existing section of the handshake 150 known to contain random bytes, allowing the cryptographic information to remain hidden in plain sight since the cryptographic information appears random itself (due to the nature of the cryptographic information). Re-using the random byte section in this way can handicap reverse engineering attempts and provide interoperability with previously written software.

The network environment 100 includes a server computer 110. For example, the server computer 110 can be the FLASH® Media Server provided by Adobe Systems Incorporated of San Jose, Calif. The server computer 110 can use a network 120 (e.g., the Internet) to communicate with one or more first client computers 130 and one or more second client computers 140. The handshakes 150a and 150b precede the sessions 135 and 145 and can include cryptographic information from the server 110 that the client(s) 130 might not know is there.

The session startup handshakes 150a and 150b can include one or more bytes that denote the version of the protocol (e.g., the RTMP protocol) and other information used to open a socket and establish a session. The handshakes 150a and 150b can also include other information, such as the current time as reported by the operating system (e.g., the number of milliseconds since the system was launched). The handshakes 150a and 150b include a block of bytes that contain random data, and the block of bytes can also include information useable for authenticating the network communications between server and client, and information for establishing an encrypted session. Such cryptographic information can be sent by the server computer 110 and the client computer(s) 140, but the client computer(s) 130 need not know that such information is present or be able to send such information.

The first client computer 130 can be a computer programmed to establish non-encrypted sessions with the server computer 110 using the session startup handshake 150a. For example, the first client computer 130 can include an older version of the FLASH® Player program, which starts a session with the server computer (e.g., the FLASH® Media Server). The server 110 can include cryptographic information in the block of random data in a network communication forming part of the handshake 150a. However, if the first client computer 130 fails to recognize this cryptographic information, and thus doesn't send appropriate return cryptographic information, the session 135 that is established with the server 110 is a non-encrypted session. Note that other aspects of the interactions between the server 110 and the client 130 can also be affected by this failure on the part of the computer 130, since the server 110 knows after the handshake 150a that the computer 130 is running a legacy program that is not aware of the new cryptographic information portion of the communication protocol.

In contrast, the second client computer 140 can be a computer programmed to establish encrypted sessions with the server computer 110 using the session startup handshake 150b. For example, the second client computer 140 can include a newer version of the FLASH® Player program, which starts an encrypted session with the server computer (e.g., the FLASH® Media Server). The server 110 can include cryptographic information in the block of random data in a network communication forming part of the handshake 150b. The second client computer 140 can recognize this cryptographic information and send appropriate return cryptographic information. This then allows the session 145 that is established with the server 110 to be an encrypted session. Note that other aspects of the interactions between the server 110 and the client 140 can also be affected by the handshake 150b, since the server 110 knows after the handshake 150b that the computer 140 is running a newer program that is aware of the new cryptographic information portion of the communication protocol. Thus, the cryptographic information used to establish encrypted sessions with new client programs can be added to an existing communication protocol used to establish non-encrypted sessions with old client programs, without the old client programs being aware of the newly added cryptographic information.

Figure 3A:
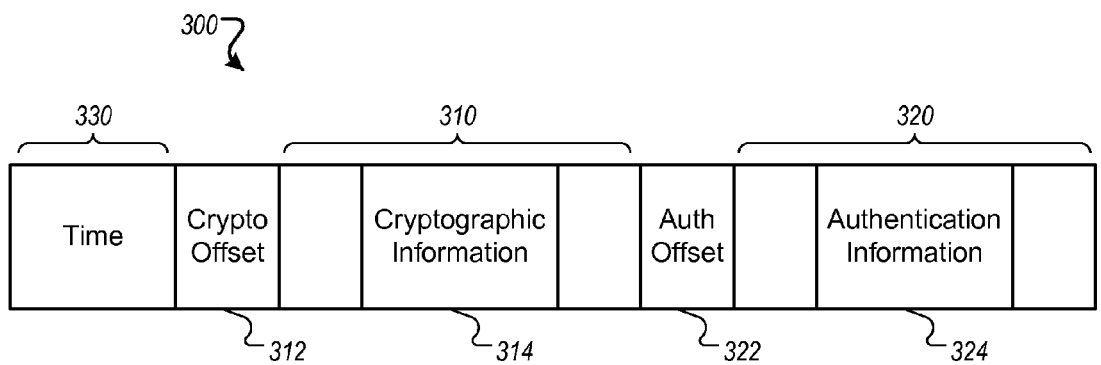
FIG. 3A shows an example network communication.

FIG. 3A shows an example network communication 300. The network communication 300 can be used, for example, as part of the handshakes 150a and 150b that precedes the sessions 135 and 145. The network communication 300 can include a time portion 330, which can include a timestamp or other time information. The time information can be used to determine whether a network communication, such as communication 300, has been delayed in the network transmission or whether the originating computer has an appropriately set time. A handshake, such as handshake 150a, can fail if the time included in time portion 330 is not properly set. Information from the time portion 330 can also be used in cryptographic algorithms relating to network communication 300.

The network communication 300 can also include a cryptographic information offset 312. The offset 312 can be used in whole or part to locate cryptographic information 314 in a pre-defined portion 310 that includes cryptographically pseudo-random data. The cryptographic information 314 can appear random and can be indistinguishable from the other random data. In this way, the cryptographic information can be hidden in plain sight. Using this technique can reduce the likelihood that reverse engineering is able to discover the details of the communication protocol.

The location of cryptographic information 314 within the pre-defined portion 310 can vary with implementation or within a given implementation. For example, the cryptographic information can be located at a pre-determined byte location, or a pre-determined byte location (e.g., offset 312) can contain a value from which the location of cryptographic information 314 can be determined. In some implementations, using cryptographic information can include the use of an encryption key establishment protocol, such as a Diffie-Hellman key exchange or other suitable technique for establishing one or more symmetric or asymmetric encryption keys.

In some implementations, using cryptographic information can include the use of authentication information 324. Authentication information 324 can be a type of message authentication code (MAC) and can be used to simultaneously verify both the data integrity (e.g., the data was not altered in transit) and the authenticity (e.g., the originator of the information is who it claims to be) of a network communication received over a communication session. Authentication information 324 can be calculated using a specific algorithm involving a cryptographic hash function in combination with a secret key, such as a hash message authentication code (HMAC). Any iterative cryptographic hash function, such as MD5, SHA-1, or SHA-256 can be used in the calculation of an HMAC. The cryptographic strength of the HMAC depends upon the cryptographic strength of the underlying hash function, on the size and quality of the key and the size of the hash output length in bits.

The location of authentication information 324 can be found similarly to the cryptographic information 314. For example, authentication information offset 322 can be used in whole or part to locate authentication information 324 within a pre-defined region 320 containing cryptographically pseudo-random data. The authentication information 324 can also be located at a pre-determined byte location, or a pre-determined byte location can contain a value (e.g., offset 322) from which the location of authentication information 324 can be determined.

In addition, although the locations of cryptographic information 320 and authentication information 324 are shown in FIG. 3A as being entirely contained within the pre-defined portions 310 and 320, respectively, it will be appreciated that either the beginning or end of the cryptographic information can be at the beginning or end of the pre-defined portion 310 or 320. For example, cryptographic information 314 can be adjacent to the cryptographic information offset 312 (if one is present, or the time portion 330, if one is not present) or the authentication information offset 322 or predefined portion 320.

Figure 3B:
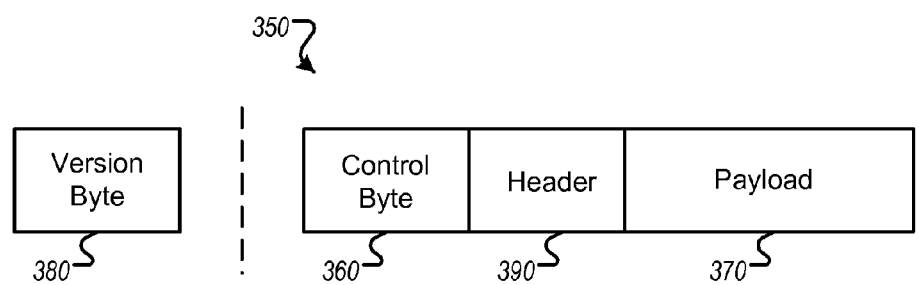
FIG. 3B shows an example network communication.

FIG. 3B shows an example network communication 350. A network communication is a part of a media stream that has been broken down in stream processing. Network communication 350 includes network communication control byte 360, header 390 and data payload 370. Network communication control byte 360 can contain state information relating to the purpose of network communication 350 and information allowing network communication 350 to be matched with a set of stored values of parameters. Header 390 can contain new values of parameters corresponding to previously stored parameter values. Network communication 350 can also not include a header 390 or include an empty header 390, and thus not include any new values of parameters. Data payload 370 can be a fixed length data segment that is part of a media stream (e.g., audio, video or data accompanying a video stream). In order to be played, for example, the data payload 370 can be decrypted using the cryptographic information 314 (or other cryptographic information derived there from) and reassembled in the proper order with other payloads that are part of the same media stream.

In some embodiments, version byte 380 can be used to provide information on the particular version of the transport protocol being used. Version byte 380 can be used in conjunction with a handshake (e.g., handshakes 150a and 150b) and a network communication 300, including cryptographic information, or a network communication 350, including data relating to media stream content. The inclusion of this information can allow easier maintenance of future protocol versions and backwards compatibility. In operation, only a single version byte would likely be necessary per session. Therefore, version byte 380 would likely not add any overhead on a per network communication basis.

In attempting to reduce the overhead of stream messages, certain assumptions can be leveraged into bandwidth savings. One such assumption involves the necessity of a 32-bit message stream ID. Statistically, there are usually less than sixty-one (61) message streams (having unique message stream IDs) in a server at any given time for any given client. Sixty-one (61) message streams can be uniquely represented in only 6 bits. Thus, having a 32-bit message stream ID is typically a waste of space.

Figure 4:
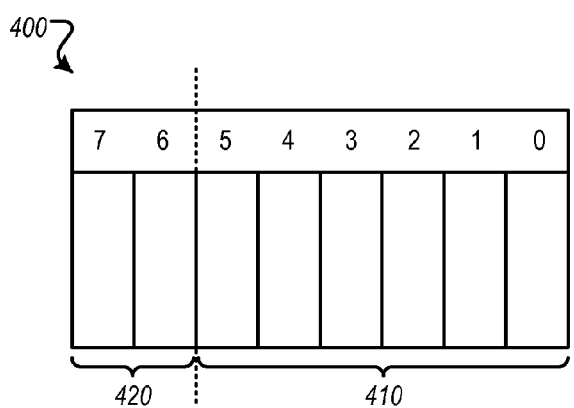
FIG. 4 shows an example network communication control byte.

FIG. 4 shows an example network communication control byte 400. Network communication control byte 400 can be the same as network communication control byte 360. Network communication control byte 400 includes a network communication identifier, such as sub media stream ID 410 and network communication type 420. While the statistics suggest that there are a maximum of sixty-one (61) message streams in a server at any one time for a particular client, artificially limiting the maximum number of streams is not an efficient means for obtaining bandwidth at the expense of stream capacity. Sub media stream ID 410 instead provides a mechanism for supporting total simultaneous streams (using a range of 3 to 65,599). Sub media stream ID 410 includes bits 0-5 of network communication control byte 400. As provided in Table 1, when the value of sub media stream ID 410 lies between 3 and 63 in some embodiments, sub media stream ID 410 is assigned at face value. Statistically, this situation will occur most often, resulting in a 6-bit sub media stream ID. However, when the value of sub media stream ID 410 is 0 in some embodiments, a second byte is added to sub media stream ID 410 that represents the range of 64 to 319. When the value of sub media stream ID is 1 in some embodiments, two additional bytes, a second byte and a third byte, are added to sub media stream ID 410 that represent the range of 320 to 65,599. Therefore, the embodiments represented by FIGS. 3B and 4 support up to 65,597 streams, while still conserving bandwidth on a statistically large number of messages. A sub media stream ID 410 value of 2 in some embodiments represents that the network communication contains a low-level protocol message, which is used to control administrative aspects of the embodiments represented by FIGS. 3B and 4.

TABLE 1

Sub media stream ID
(Bits 0-5 of Control Byte)

| Value | Meaning |
| --- | --- |
| 3-63 | Sub media stream ID is the face value of 3-63. |
| 0 | There is another byte that represents the range 64-319 (Second byte + 64). |
| 1 | There are two more bytes representing the range 320-65,599 ((Third byte) * 256 + (Second byte + 64)). |
| 2 | The network communication is a Low-Level Protocol Message. |

The configuration of the real-time priority-based protocol represented by FIGS. 3B and 4 advantageously leverages the statistical maximum of sixty-one (61) streams. Because there are usually less than sixty-one (61) streams in the server at any given time for a client, only the 6 bits of sub media stream ID 410 will generally be sent. Thus, the 32-bit header for message stream IDs of the current technologies can be reduced to only 6 bits for the majority of data streams. In rare cases, in which the number of streams exceeds 61, the additional bytes of information can be included to support those extra streams.

The configuration of sub media stream ID 410 in some embodiments, as provided in Table 1, demonstrates implementation of a state machine having different state associations using its first 2 bits to address many different levels of streams. In furtherance of the state machine concept implementing the embodiments, network communication type 420 provides four states/types for classifying each network communication message. Network communication type 420 identifies the type or purpose of the network communication.

As provided in Table 2, bits 6 and 7 of network communication control byte 400 includes network communication type 420. When the value of network communication type 420 is 0 in some embodiments, the network communication state or type indicator is a new/reset message type (Type 0) or indicates a new stream. This signifies the first message sent on the network communication stream in some embodiments. As is described in Table 2, a Type 0 message can include additional bytes of information that include the typical header information of the current stream methods, such as message length, message type ID, and message stream ID. Instead of using a timestamp, however, the embodiments represented by FIGS. 3B and 4 use a time delta (Δ), or the change in time from the previous message. The time-delta (Δ) is essentially an absolute time because it is usually added to '0' time. Because the Type 0 network communication includes a considerable amount of information, it will generally be larger than the subsequent network communications in the stream.

When the value of network communication type 420 is 1 in some embodiments, the network communication state or type is a new media indicator of a specified new time change/time delta, length, and any new message type ID (Type 1). This state can signify a new network communication that is measured using the new specified time delta (i.e., the time stamp change from the last message) and the specific length. Thus, a subsequent message in a network communication stream that belongs to the same sub media stream ID, but that is a different type/format and a different time delta than the previous network communication only has to include header information on the message type ID, time delta, and the length. A Type 1 network communication can, therefore, have fewer bytes of header information than the Type 0 network communication, because the state machine implementing the represented embodiments has been set with certain information by the Type 0 network communication that remains unchanged for the Type 1 network communication.

A value for network communication type 420 of 2 in some embodiments represents the network communication state or type for a new message defined only by a single piece of header information, such as the time delta (Type 2) in a new time indicator. A Type 2 network communication can have all of the same information from the previous network communication except possibly for a change in the time delta. Therefore, the state machine might only need to use the new time delta to change to the proper new state.

The least amount of overhead or header information in the embodiments represented by FIGS. 3B and 4 accompanies the Type 3 network communication, when the value of network communication type 420 is 3. A Type 3 network communication is a continuation indicator. A continuation indicator network communication can use the same message stream ID, the same message type ID, the same time change/time delta, and the same length of the previous network communications. Therefore, the state machine implementing this embodiment can be already set to the appropriate state. One design goal can be to optimize the streaming process to get the network communications to Type 3 network communications as soon as possible. Therefore, Type 3 network communications that are essentially continuations of a same message are transmitted with a 0-length header.

The 0-length header of the Type 3 network communications is especially interesting when the Type 3 network communication represents the beginning of a new message. This scenario can occur when two consecutive network communications use the same message stream ID, the same message type ID, the same time change/time delta, and the same length as the previous network communication. In this case, a new message is enabled without any required header information, a 0-length header.

TABLE 2

Network Communication Type
(Bits 6-7 of Control Byte)

| Bits | Description |
|---|---|
| 00 | (Type 0) Begin new message. Reset all information. Type 0 is used when the time is restarted or for the first message sent on the network communication stream. A Type 0 network communication message resets the time to 0 before adding the supplied time delta (Δ). A Type 0 network communication message can contain the following header information:<br>3 bytes - message time delta (Δ)<br>3 bytes - message length<br>1 byte - message type ID<br>4 bytes - message stream ID |
| 01 | (Type 1) Begin new message using specified Δ, new length, and/or new message type ID. A Type 1 network communication message can contain the following header information:<br>3 bytes - Δ<br>3 bytes - new message length<br>1 byte - message type ID |
| 10 | (Type 2) Begin new message using specified Δ. A Type 2 network communication message can contain the following header information:<br>3 bytes - Δ |
| 11 | (Type 3) Continuation (possibly start new message). A Type 3 network communication message can contain no header information, containing just the raw data/payload. |

Figure 2:
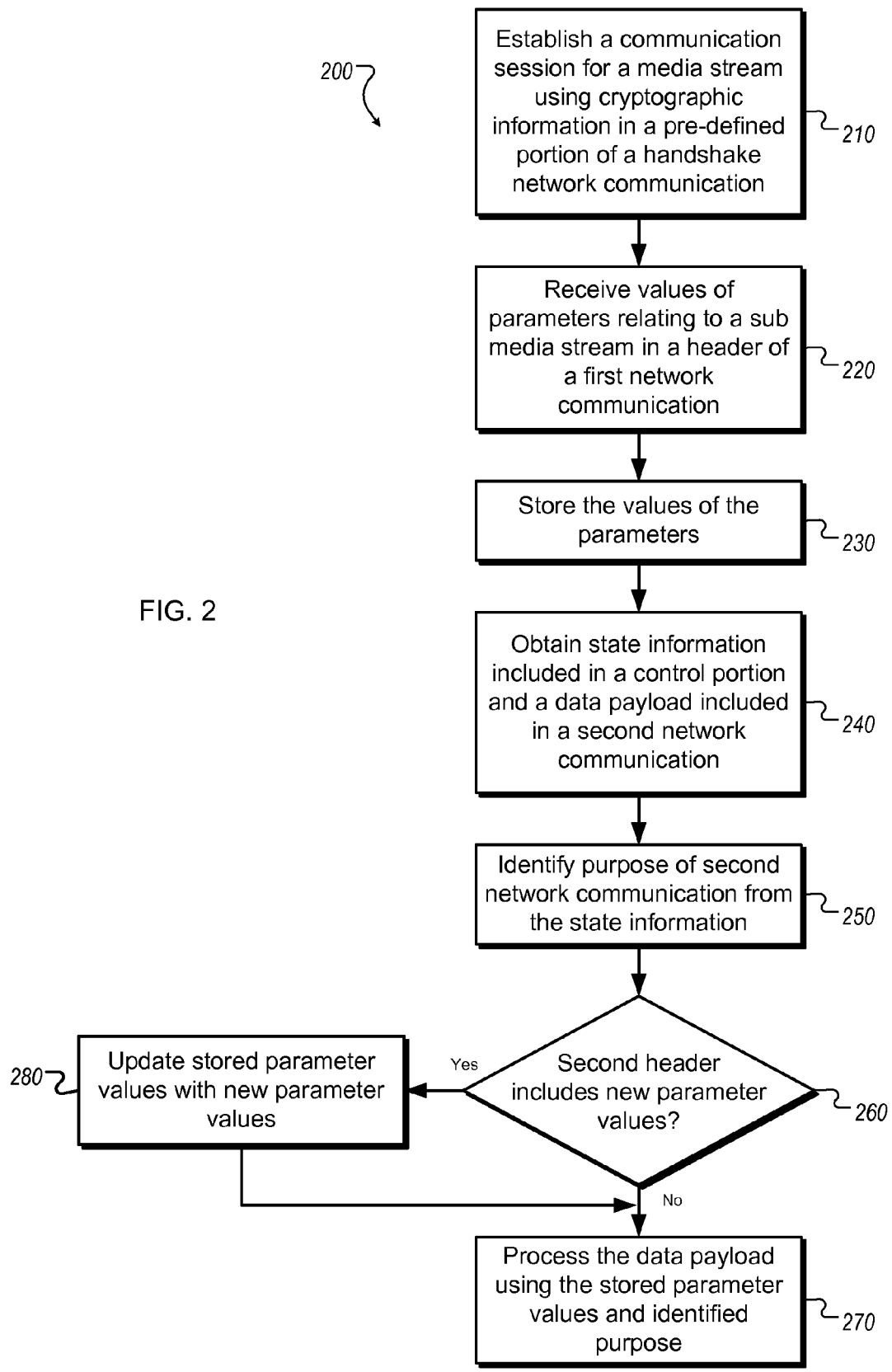
FIG. 2 shows an example process of imparting real-time priority-based network communications in an encrypted communication session.

FIG. 2 shows an example process 200 of imparting real-time priority-based network communications in an encrypted communication session. A communication session for a media stream is established 210 using cryptographic information in a pre-defined portion of a network communication. For example, the cryptographic information in portion 310 can be used by the computer 140 to establish an encrypted session 145 with server computer 110. Also, authentication information in portion 320 can be used to verify the integrity and authenticity of network communications in the communication session.

Values of parameters relating to a sub media stream, included in a header of a first network communication, are received 220. For example, the parameters (e.g., a stream ID, media stream length, media type and time delta) can be included in header 390 of network communication 350. The value of the parameters are stored 230. For example, software on computer 140 can store, in physical memory or on a hard drive, the values of parameters across multiple network communications.

State information in a control portion and a data payload included in a second network communication is obtained 240. For example, the state information can be included in control byte 360 and the data payload can be payload 370. The state information can include network communication type 420 and sub media stream ID 410, allowing, in some embodiments, the purpose and sub media stream association of the second network communication to be obtained in 1 byte of information (e.g., control byte 360).

The purpose of the second network communication is identified 250 from the state information. For example, network communication type 420 can indicate that the network communication is starting a new sub media stream or that a new media type is being transmitted over the sub media stream (see Table 1). Process 200 determines 260 whether the header of the second network communication includes new parameter values. For example, some network communications (e.g., Type 3) can include no new parameter values (or a header) while others (e.g., Type 1) can include multiple new parameter values. When the header of the second network communication includes new parameter values, the state information can indicate that the stored values are to be updated 280 with the new values. Process 200 can look for new parameter values in response to the purpose of the network communication. For example, there can be times when network communication will include extraneous header information, such as values for parameters that should not be used to update the stored values. The purpose can enable process 200 to avoid incorrectly updating stored parameter values.

The data payload is processed 270 using the stored parameter values and the identified purpose. For example, payload 370 can be correctly assembled and played based on the stored values of time deltas and media type indications. The data payload can also be process as the beginning network communication in a new sub media stream based on that being identified as the purpose.

Figure 5A:
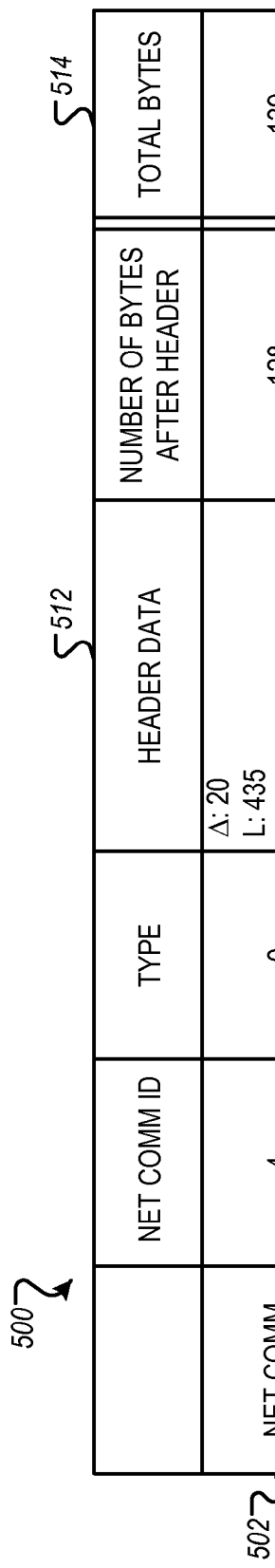
FIG. 5A shows an example network communication stream having network communications.

FIG. 5A shows an example network communication stream 500 having network communications 502-508. Network communication 502 is a Type 0 network communication with a sub media stream ID of 4. Because network communication 502 is a Type 0 network communication, it includes additional header data 512, making network communication 502 relatively larger in terms of total bytes 514 than network communications 504-508. The additional data includes the message stream ID (12346), the message type ID (9), the message length (435), and the time delta (20). This header information is set into the state machine. Network communication 504 is a Type 3 network communication belonging to the same sub media stream ID 4. Because network communication 504 belongs to the same media stream ID and is the same type and length as network communication 502, the state set by the extra header information of network communication 502 already defines how to handle network communication 504. According to some embodiments, network communication 504 only needs to designate the sub media stream ID and network communication type. Therefore, only a single byte of overhead is added to the data payload of network communication 504, as represented by the total bytes 514. Network communications 506 and 508 are also Type 3 continuation network communications that require only an additional byte of control information to adequately handle those network communications.

Figure 5B:
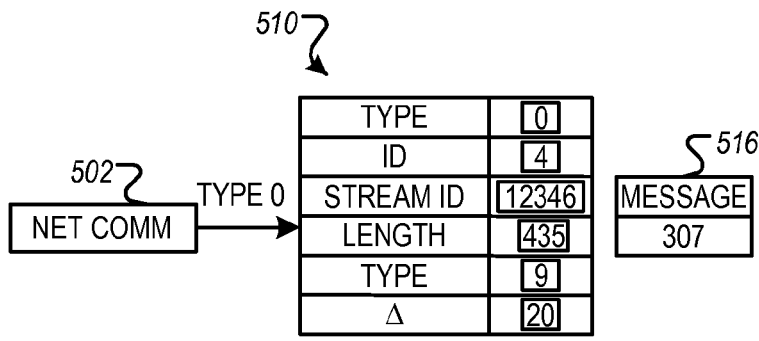
FIGS. 5B-5E show an example state machine receiving network communications.

FIGS. 5B-5E show an example state machine 510 receiving network communications 502-508. FIG. 5B shows state machine 510 receiving a Type 0 network communication. State machine 510 sees that network communication 502 is a Type 0 network communication and expects each of the state variables to be set with the header information contained in network communication 502. In some embodiments, state machine 510 can also include message count 516 that keeps track of the progress of each receiving message. Network communication 502 brings 128 bytes of data payload. Therefore, using the message length parameter, state machine 510 can subtract 128 bytes from the total length, 435 bytes, to hold the remaining message expected length of 307 bytes in message 516. The state machine represented by FIG. 5B is used in both the send direction and the receive direction. As network communications arrive at the receiver system, the state machine is used in reverse to translate the state assignments necessary to play the data stream network communication. Therefore, the state machine for the real-time priority-based communication system can be located at least at the sending entity and the receiving entity.

Figure 5C:
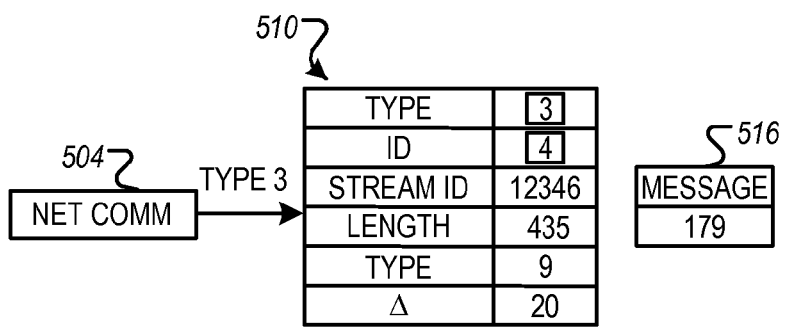
Figure 5D:
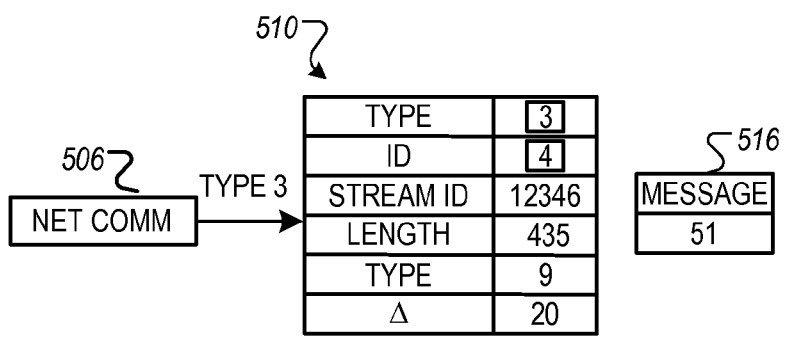
Figure 5E:
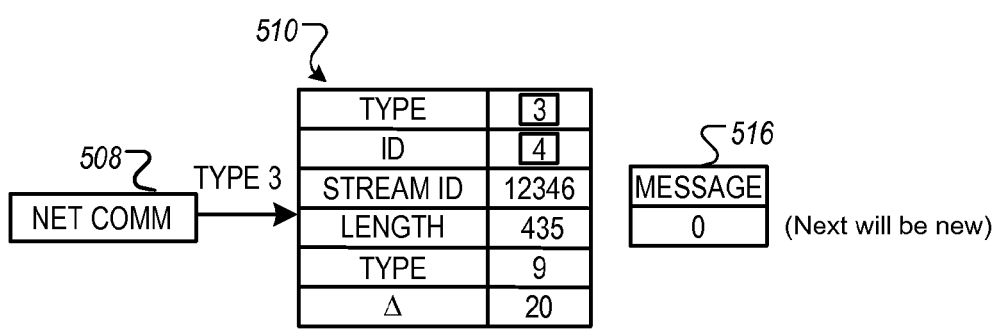

FIGS. 5C-5E show state machine 510 receiving Type 3 network communications. In FIG. 5C, state machine 510 reads that network communication 504 is a Type 3 network communication, and therefore, expects that only the network communication type and sub media stream ID state variables will be changed. Because network communication 504 could belong to a different sub media stream than that of network communication 502, the sub media stream ID is used in the Type 3 continuation network communications. The remaining state variables set by network communication 502 remain the same. Message 516 is changed again to reflect the 128 bytes of payload data delivered by network communication 504. 179 bytes now remain in the message. In FIG. 5D, state machine 510 reads that network communication 506 is also a Type 3 network communication, and therefore, also expects that only the network communication type and sub media stream ID state variables will be changed. The remaining state variables set by network communication 502 continue to remain the same. Message 516 is again changed to reflect the 128 bytes of payload data delivered by network communication 504. 51 bytes now remain in the message. FIG. 5E also represents state machine 510 receiving a Type 3 continuation network communication. With this receipt, because state machine 510 knows the maximum network communication data payload length is 128, state machine 510 knows that this will be the last network communication for this particular message, as reflected in message 516 zeroing out. The next network communication will, by process of elimination, have to be for a new message (or be a low-level protocol message).

Referring back to Table 1, when the value of sub media stream ID 40 is 2, in some embodiments, the state is designed to change for the system to expect a low-level protocol message. Table 3 describes two low-level protocol messages that can be implemented in various embodiments. In such embodiments, a message ID of 1 represents a change to the maximum network communication size. The parameter passed with such a message ID can be an integer representing the size for all future network communications. Another message ID, shown as message ID 2 in Table 3, can allow for an abort signal to be sent to the network corresponding to a particular sub media stream ID. For example, if a communication session is in mid-stream when the transmitting end shuts-down, or other such event, the abort message would generally inform the network that it should not expect any further network communications, thus, aborting the stream. Many other optional low-level protocol messages can also be provided for in various embodiments. The two messages provided for in Table 3 are merely examples.

TABLE 3

Low-Level Protocol Messages

| Message | Message ID | Message Data | Description |
| --- | --- | --- | --- |
| Set Network Communication Size | 1 | 4 bytes representing an integer. Bytes are sent in "network" order (i.e., order of significance) | The integer represents the new maximum network communication size for all future communications. |
| Abort Message | 2 | 4 bytes representing an integer. Sent in "network" order. | The integer represents a sub media stream ID. If that network communication stream is currently waiting to complete a message (i.e., expecting more communications). The message stream is aborted. |

Some embodiments obtain benefits from breaking the individual messages further down into network communications. While it might appear simpler to send one message and then the next, a linear process, such as this, can be much less efficient. A stream representing some media presentation can include several different sub media streams. One sub media stream can be for the audio, one for the video, and another for data. The combination of each of these sub media streams makes up the entire streaming presentation. Therefore, it becomes important to coordinate smooth delivery of each of the sub media streams to facilitate the smooth playback of the entire stream. For example, a video key frame can have a large amount of data in contrast to audio messages that are generally very small. However, the audio messages are much more time sensitive than the video messages due to the nature of human hearing. Therefore, if an audio message is sent from the audio sub media stream, followed by a very large video message from the video sub media stream, followed by the next audio message, the audio stream can typically stall because the next audio message simply might not arrive in time.

In operation, the larger video messages are typically much less frequent, even though they can be much larger. Therefore, interleaving other messages in between the video messages is acceptable as long as the video message eventually arrives in time for the smooth playback of the video sub media stream. Considering this balancing process, breaking the messages into network communications that can be more easily balanced and interleaved increases the efficiency of the streaming. While no one maximum network communication size is best for all situations, a given maximum can be beneficially set in which the video and data messages arrive without too much effect on the timely arrival of the audio network communications.

In some embodiments, the maximum network communication size is set to correspond to the complete length of a standard audio message in the audio sub media streams in order to ensure timely delivery of the complete audio message. For example, the sampling rate for the audio compression algorithm, Nellymoser, can be 8 kHz. The 8 kHz sampling typically generates messages that are 128 bytes long. Therefore, in some embodiments that can use the Nellymoser compression algorithm, the maximum network communication size can be set to 128 bytes. Other audio compression formats can produce messages that are either greater than or less than 128 bytes. In such cases, a low-level protocol message can be used to change the maximum network communication size of the applicable embodiments to achieve optimal performance.

Figure 6:
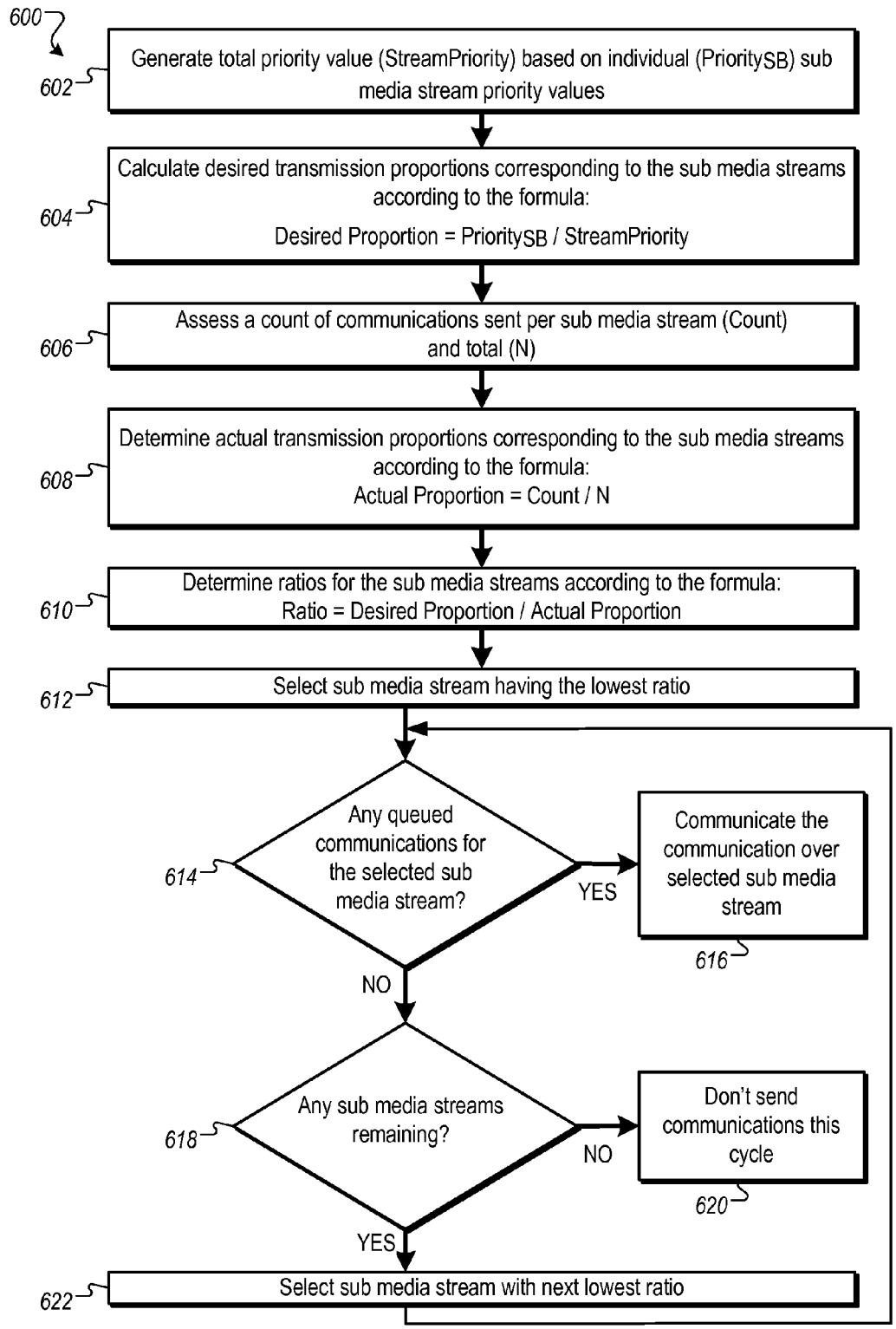
FIG. 6 shows an example process for scheduling real-time priority-based network communications in an encrypted communication session.

FIG. 6 shows an example process 600 for scheduling real-time priority-based network communications in an encrypted communication session. Balancing the transmission of the network communications in the different media sub media streams can be controlled by a scheduling process that directs which network communication of which stream or sub media stream to send next. Each type of media can be assigned a specific priority value. For example, because audio messages are the most sensitive, they can be assigned the highest priority value. Video and data messages would each likely be assigned lower priority values.

The priority of each sub media stream (Priority$_{SB}$) is summed 602 into a total stream priority (StreamPriority). A desired proportion for sending each sub media stream within the stream is calculated 604 according to formula:

Desired Proportion=Priority$_{SB}$/StreamPriority

The total number of network communications sent (Count) are counted 606 per sub media stream over a group of preceding network communications (N). N represents a scheduling sampling window that can be pre-set by a user or developer. The sampling window can be based, on a period of time or a count of network communications. For example, process 600 can count network communications sent (Count) over a period of one second or 5 seconds. The network communications for each sub media stream can be counted 606 concurrently or sequentially. Process 600 can also send a pre-set number of network communications and count 606 the number of network communications sent in each sub media stream out of the pre-set number. The actual proportion of network communications sent per sub media stream in the preceding N network communications is developed 608 according to formula:

Actual Proportion=Count/N

A ratio of desired proportion to actual proportion is determined 610 for each sub media stream. The sub media stream with lowest ratio is selected 612. The process 600 determines 614 whether the selected sub media stream has a network communication queued. If a network communication is queued for the selected sub media stream, the sub media stream network communication is sent 616. If no data is queued for the selected sub media stream, the determination 618 is made whether there are any other waiting sub media streams left. If there are no remaining sub media streams, then no network communications are sent in the cycle 620. However, if there are remaining sub media streams, a new sub media stream is selected 622 that has the next lowest ratio of desired to actual proportions. The process 600 can repeat the operations 614-622, depending on the case, until all network communications in each sub media stream are sent.

Scheduling process 600 can result in a favorable balance of streams. If all sub media streams always have data to send, not only does scheduling process 600 provide for those streams to obtain the proper proportion of network communications sent, but also provides a good interleaving mix over the scheduling window. When some sub media streams do not have data or, at least, do not have data queued, scheduling process 600 allows the lower priority sub media streams to use a greater bandwidth. Thus, bandwidth use is routinely optimized. One embodiment can achieve desired results with audio having a priority of 100, data priority of 10, and video priority of 1. However, other various priority assignments can prove better for different situations and known or expected data types or data loads.

Figure 7:
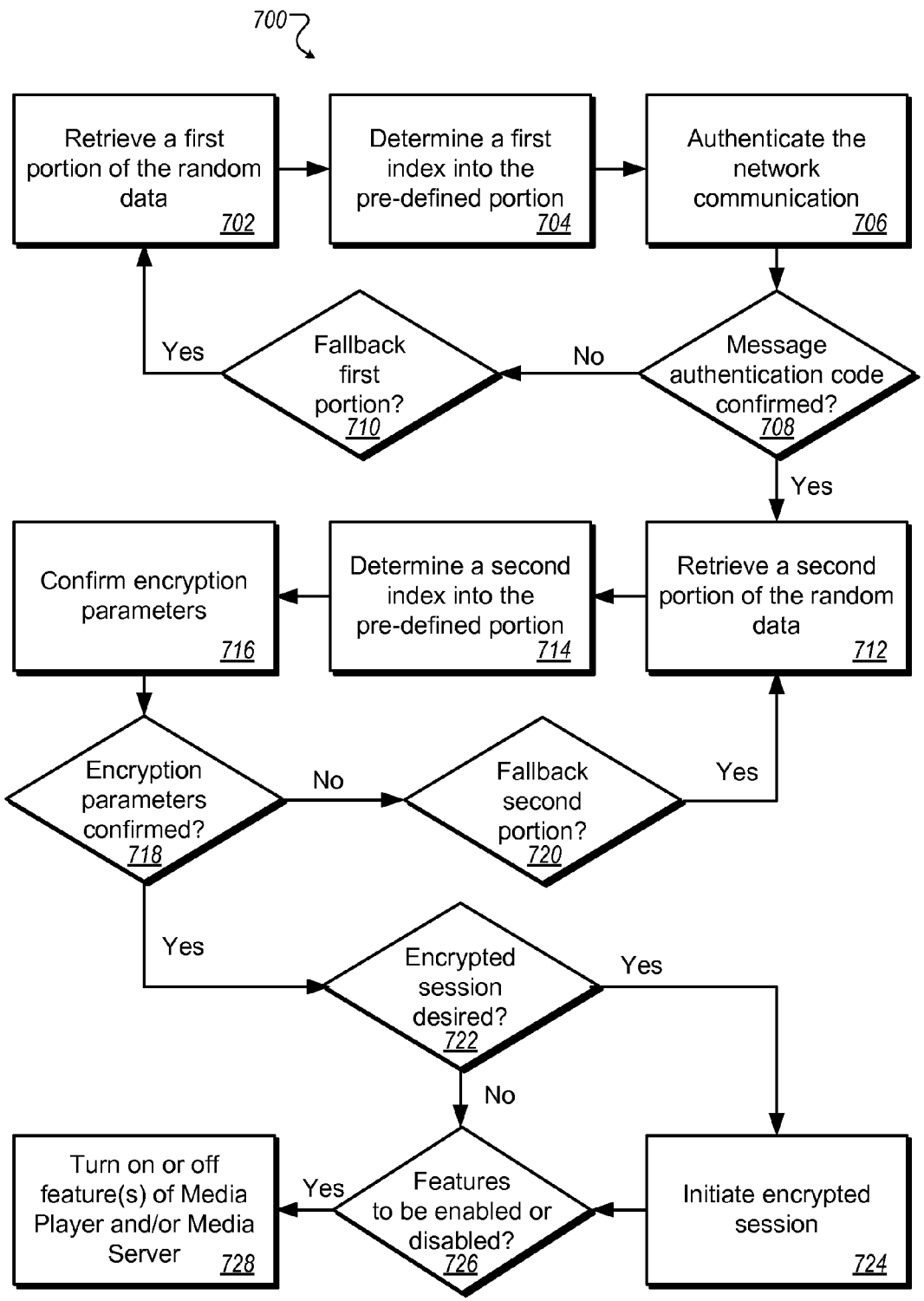
FIG. 7 shows an example process of imparting cryptographic information for use in establishing encrypted sessions and enabling/disabling features in a media player/server system.
Figure 8:
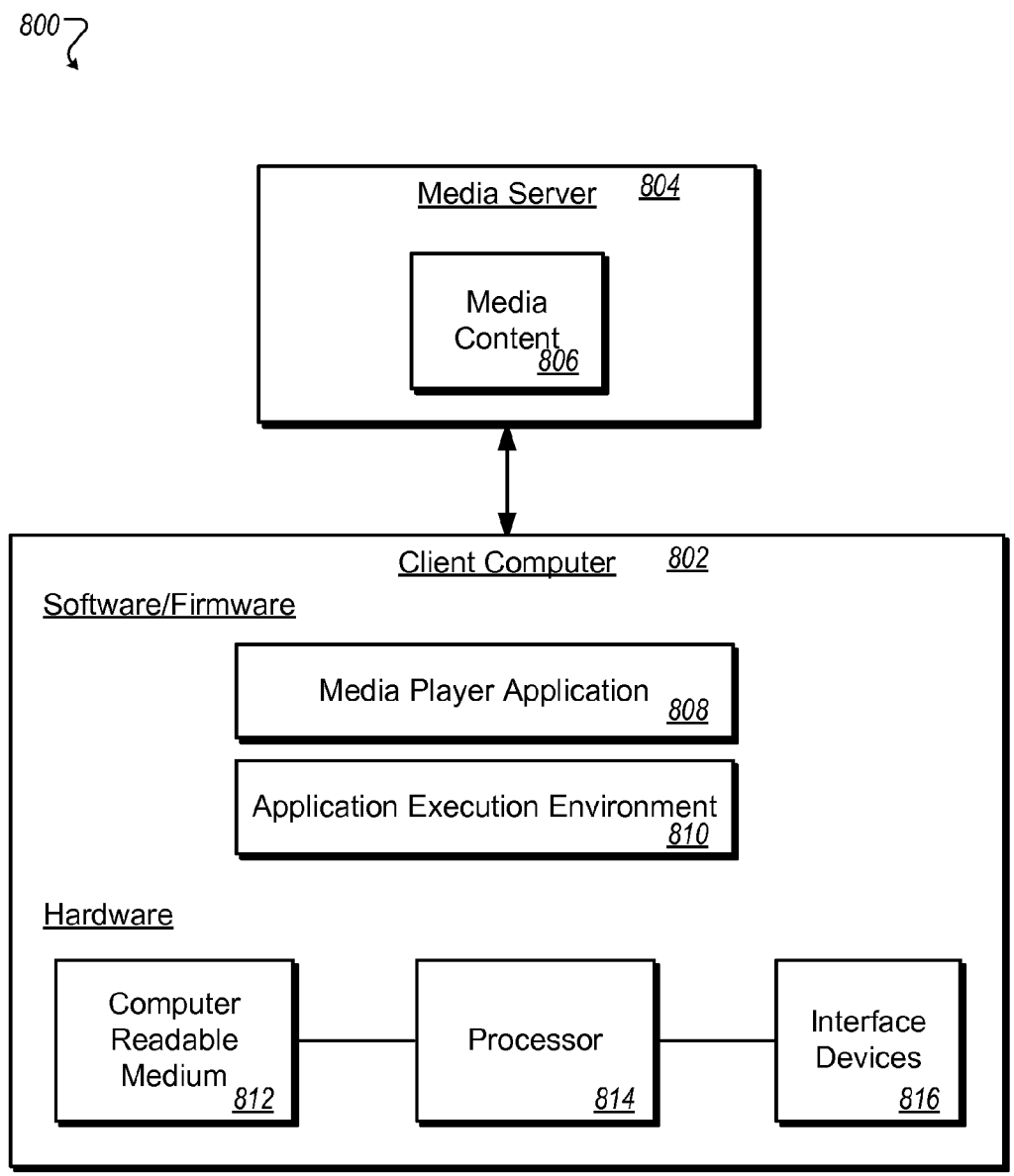
FIG. 8 shows another example network environment in which real-time, priority-based communications are imparted over an encrypted communication session for use in playing media content.

FIG. 7 shows an example process 700 of imparting cryptographic information for use in establishing encrypted sessions and enabling/disabling features in a media player/server system, such as the client-server environment 800, FIG. 8. The process 700 includes operations for authentication, determining encryption parameters, and turning on or off features associated with the network communication. For example, the network communication can involve a user employing a FLASH® Player program to play media available from the FLASH® Media Server program. In some implementations, features can be enabled or disabled based on version information that can be separate from the cryptographic information. For example, feature availability (e.g., audio or visual capabilities) might depend on the version of the FLASH® Player program installed on the user's client computer.

A first portion of the random data can be retrieved 702. For example, in the network communication 300 sent by client computer, the server can look in a pre-determined byte position within the pre-defined portion 310. A first index into the pre-defined portion can be determined 704 based on the retrieved first portion. For example, one or more bytes of the random data can be used as the dividend in a modulo operation, where the divisor is the length of the region of the pre-defined portion 310 set aside for a message authentication code (e.g., an HMAC), minus the length of the message authentication code. The first index can then be set equal to the remainder of this modulo operation plus a pre-defined offset (which can be zero).

Note that various combinations of the random data can be used to generate the dividend. For example, x bytes of the random data can be treated as a single binary number forming the dividend falling in the range of zero to $2^{(8x)}-1$, or the same x bytes of the random data can be treated as x binary numbers that are added together to form the dividend falling in the range of zero to $x(2^8-1)$. Various other combinations of the random data are also possible. In addition, the first index can be determined from the first portion of the random data alone, or from the first portion in combination with other information retrieved from the network communication. For example, such other information can come from the header 330 or the payload 340.

In any event, once the index is determined, this index corresponds to the starting position of the cryptographic information used for message authentication (e.g., the starting point of the HMAC) in the block of otherwise random data. The network communication is authenticated 706 using this cryptographic information. For example, the authentication can involve using the first index to access an HMAC in the network communication 300. If the message authentication code is not confirmed 708, then the process 700 can check 710 whether a fallback first portion is available. This occurs when the first index determined 704 fails to locate a message authentication code usable to authenticate 706 the network communication.

In this case, one or more fallback processes can be provided for retrieving 702 the first portion and determining 704 the first index. The fallback processes can use a different technique for retrieving 702 the first portion and/or determining 704 the first index. determining 704 the first index. These fallback processes can provide additional security for the authentication process, allowing a server system to change the indexing technique when a currently used technique has been discovered, and the client computers can then automatically fall back to the new indexing technique. Once all available fallback processes have been tried, the process 700 ends without the network communication having been authenticated.

If the message authentication code is confirmed 708, then a second portion of the random data is retrieved 712. For example, in the network communication 300 sent by client computer, the server can look in another pre-determined byte position within the pre-defined portion 310. A second index into the pre-defined portion can be determined 714 based on the retrieved second portion. For example, one or more bytes of the random data can be used as the dividend in another modulo operation, where the divisor is the length of the region of the pre-defined portion 310 set aside for encryption parameters (e.g., Diffie Hellman information), minus the length of the encryption parameters. The second index can then be set equal to the remainder of this modulo operation plus a pre-defined offset (which can be zero).

As with the message authentication code, various combinations of the random data can be used to generate the dividend. For example, x bytes of the random data can be treated as a single binary number forming the dividend falling in the range of zero to $2^{(8x)}-1$, or the same x bytes of the random data can be treated as x binary numbers that are added together to form the dividend falling in the range of zero to $x(2^8-1)$. Various other combinations of the random data are also possible. In addition, the second index can be determined from the second portion of the random data alone, or from the second portion in combination with other information retrieved from the network communication. For example, such other information can come from the header 330 or the payload 340. Moreover, it will be appreciated that the random data section needs to be larger than the total length of the message authentication code and the encryption parameters, e.g., larger than one hundred and sixty bytes when using a thirty two byte HMAC and one hundred and twenty eight bytes of Diffie Hellman information.

In any event, once the index is determined, this index corresponds to the starting position of the encryption parameters used for establishing a cryptographic key (e.g., the starting point of the Diffie Hellman information) in the block of otherwise random data. This cryptographic information in the network communication is confirmed 716. This confirmation can involve using the second index to access and confirm encryption parameters in the network communication 300. If the encryption parameters are not confirmed 718, then the process 700 can check 720 whether a fallback second portion is available. This occurs when the second index determined 714 fails to locate encryption parameters usable to initiate encrypted communications in the network environment.

In this case, one or more fallback processes can be provided for retrieving 712 the second portion and determining 714 the second index. The fallback processes can use a different technique for retrieving 712 the first portion and/or determining 714 the second index. Note that these processes can also be different than those used for the first index. These fallback processes can provide additional security for the encrypted session establishment process, allowing a server system to change the indexing technique when a currently used technique has been discovered, and the client computers can then automatically fall back to the new indexing technique. Once all available fallback processes have been tried, the process 700 ends without the encryption parameters having been confirmed.

If the encryption parameters are confirmed 718, then a determination 722 can be made if an encrypted session is desired. For example, the encryption parameters can contain information that the session (e.g., session 145) is to be an encrypted session. If so, then the encrypted session is initiated 724. Otherwise, an un-encrypted session can be initiated. Either session (e.g., encrypted or un-encrypted) can be between the client computer 802 (e.g., executing FLASH® Player program) and the media server 804 (e.g., FLASH® Media Server), in FIG. 8.

If it is determined 726 that one or more features are to be enabled or disabled, then one or more features of the media player, the media server or both, are turned on or off 728. For example, a set of features can be turned on or off according to the version number of the client media player. This version number can be provided by the client media player (e.g., in non-encrypted and non-disguised form in the handshake 150), and the server can decide to trust the version number provided based on the fact that the client properly incorporated cryptographic information within the random byte section of a network communication (e.g., the client media player is not a legacy player that has been modified to improperly identify itself as a newer version).

FIG. 8 shows another example network environment 800 in which real-time, priority-based communications are imparted over an encrypted communication session for use in playing media content. The network environment 800 includes a client computer 802 and a media server 804. The media server 804 can provide media content 806 to the client computer 802. For example, media server 804 can include a FLASH® Media Server program. The media content 806 can include web applications, games and movies, and multimedia content for client computers (e.g., home personal computers, mobile phones, personal digital assistants, smart phones, or various embedded devices.)

The client computer 802 can include software, firmware and hardware. The hardware can include a computer readable medium 812, a processor 814, and one or more interface devices 816. The computer readable medium 812 can include one or more hard drives, external drives, magnetic disks, optical disks, tape drives, memories devices, etc. The processor 814 can include one or more central processing units capable of interpreting computer program instructions and processing data, and the processing units can include one or more processor cores. The interface devices 816 can include one or more display and audio devices (e.g., computer screens, computer monitors, digital displays, liquid crystal displays (LCDs), light emitting diodes (LEDs), etc.) and audio-capable components (e.g., microphones, speakers, etc.). The interface devices 816 can support a graphical user interface (GUI) by which the user sees, hears and experiences the output of a media player application 808.

The software/firmware can include the media player application 808 and an application execution environment 810. For example, the media player application 808 can be a FLASH® Player program installed on a home computer or other electronic device. The media player application 808 can run in the application execution environment 810, which can be an operating system (OS) for the computer 802, or a cross-OS runtime environment installed on the computer 802, such as the Adobe® AIR™ runtime environment available from Adobe System Incorporated of San Jose, Calif.

The random byte section that embeds the cryptographic information can be included in the network communications between the client computer 802 and the media server 804. For example, the random byte section can be generated by a user's FLASH® Player program and by the FLASH® Media Server program. As noted above, cryptographic information (e.g., including Diffie Hellman key exchange and HMAC information) can be injected into the random byte section at pre-determined or program-determined locations. In some implementations, the locations can be determined by various processes, which can use pieces of the random data to index the locations of the cryptographic information. The receiving end of the communication, knowing the new protocol, can locate and remove the cryptographic information from the random byte section. If the cryptographic information can be verified, then the receiving side knows that the new protocol is being used. If the cryptographic information cannot be verified, one or more fallback positions can be checked before determining that the new protocol is not being used (because the expected cryptographic information cannot be found in the random byte section), and thus the communication is of a legacy type. Note that from the perspective of an external eavesdropper, the cryptographic information is seen as nothing more than the previously included random data, which can be used for bandwidth detection.

Figure 9:
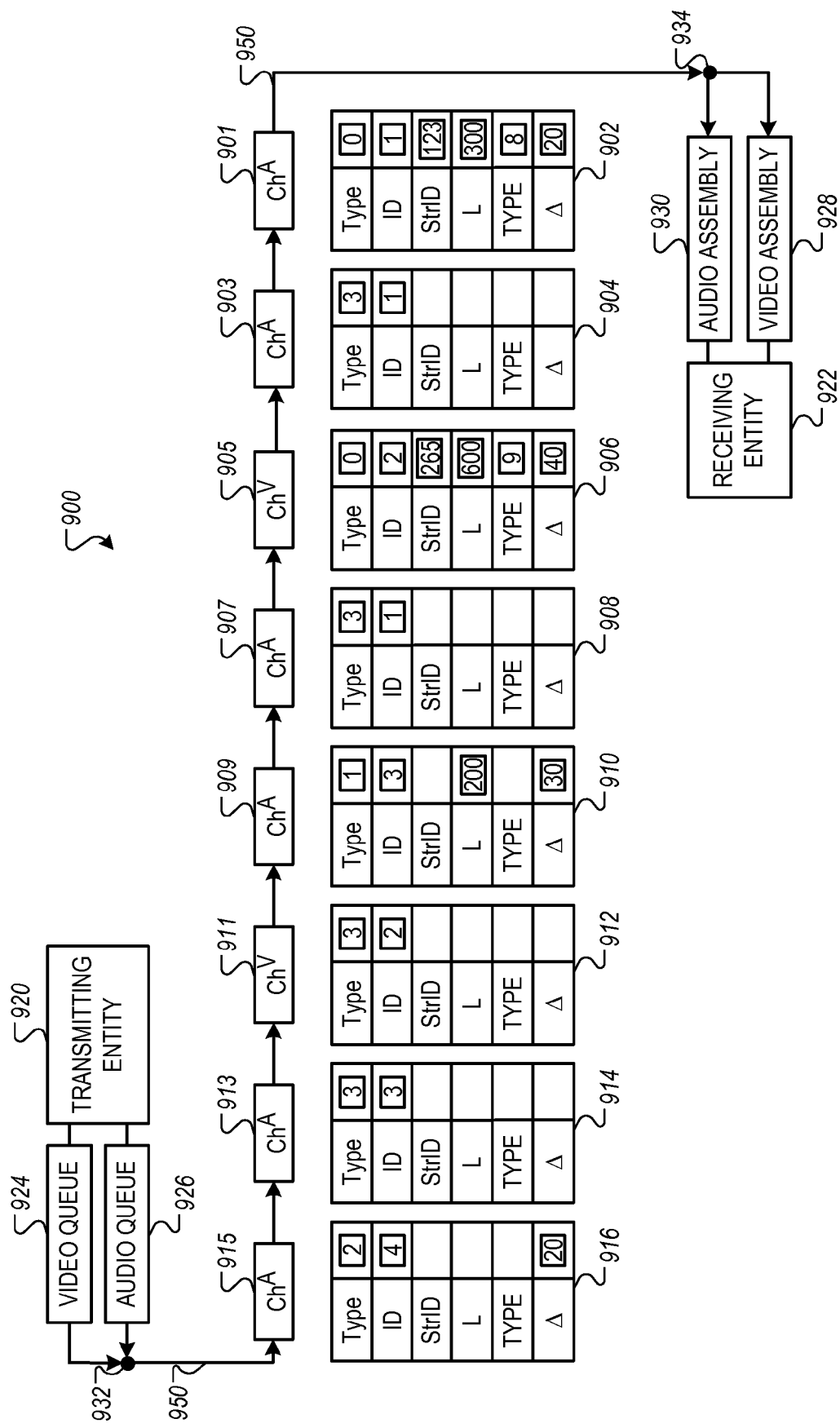
FIG. 9 represents an example sequence of interleaved audio and video network communications in a real-time priority-based communication system.

FIG. 9 represents an example sequence of interleaved audio and video network communications in a real-time priority-based communication system 900. System 900 shows a one-way communication session of streaming media occurring from transmitting entity 920 to receiving player 922 over network path(s) 950. The messages to be streamed can include audio, video, and data messages. Network path(s) 950 can support an encrypted communication session, which can be transmitted over a network connection. FIG. 9 shows a message that includes video and audio sub media streams. As the video and audio sub media streams are broken into video and audio network communications, the state machine of the various embodiments supply the necessary header information for the network communications. Transmitting entity 920 places the network communications in either video queue 924 or audio queue 926 to await transmission.

The scheduler at transmitting entity 920 controls when network communications are sent to network interface 932 from either video or audio queue 924 and 926. Network communications 901, 903, 905, 907, 909, 911, 913, and 915 are represented on network path(s) 950 along with corresponding header parameters 902, 904, 906, 908, 910, 912, 914, and 916 configured according to the example. Because audio network communications are more sensitive than video network communications, the scheduler sends audio network communication 901 over network path(s) 950 first. Audio network communication 901 includes header 902. Header 902 describes audio network communication as a Type 0 network communication and gives the necessary information that accompanies a Type 0 new message network communication, including the network communication ID, message stream ID, length, message type, and time delta. The state machine at receiving player 922 sets the state for the audio sub media stream beginning with audio network communication 901. Audio network communication 903 is the next network communication sent by the scheduler at transmitting entity 920 and includes header 904. Header 904 identifies network communication 903 as a Type 3 continuation header belonging to network communication ID 1, the network communication ID assigned to the first audio sub media stream. Because audio network communication 903 is a continuation network communication, only the network communication type and network communication ID are required in the header information. The state machine at receiving entity 922 reads that network communication 903 is a Type 3 continuation network communication and keeps all states fixed for the audio sub media stream of network communication ID 1.

The scheduler at transmitting entity 920 sends video network communication 905 next along with header 906. Because video network communication 905 is the first of the video sub media stream, it is designated a Type 0 network communication and includes all of the necessary header information to go along with the first network communication of the video sub media stream. Thus, video network communication 905 can include a different network communication ID, message stream ID, length, message type, and time delta. The state machine at the receiving entity sets the necessary states for the video sub media stream of network communication ID 2. The next network communication sent by the scheduler is audio network communication 907 and header 908. Header 908 identifies network communication 907 as a Type 3 continuation network communication of network communication ID 1. The state machine refers to the states set for the audio sub media stream of network communication ID 1 and maintains those settings for the first audio sub media stream.

The scheduler then sends audio network communication 909 and header 910 across network path(s) 950. Header 910 identifies audio network communication 909 as a Type 0 new message network communication. The state machine at receiving entity 922 resets all information in the states of the audio sub media streams and sets the new states according to header 910. The next network communication in the interleaved sequence is video network communication 911 along with header 912. Header 912 identifies video network communication 911 as a Type 3 continuation network communication of video sub media stream network communication ID 2. The state machine at receiving entity 922 accesses the states set for network communication ID 2 and keeps all of the state information in tact for video network communication 911. The next network communication sent on network path(s) 950 is audio network communication 913 and header 914. Header 914 identifies network communication 913 as a Type 3 continuation network communication of network communication ID 3. The state machine accesses the states saved for the audio sub media stream of network communication ID 3 and maintains each state intact. The final network communication shown in FIG. 9 is audio network communication 915 and header 916.

Header 916 identifies network communication 915 as a Type 2 network communication representing a new message having a new time delta. The state machine reads that network communication 915 is a Type 2 network communication and expects the beginning of a new audio sub media stream with only a change to one of the states for a new network communication ID 4.

As each of network communications 901, 903, 905, 907, 909, 911, 913, and 915 are received at receiving entity 922 through network interface 934, the audio network communications are reassembled in audio assembly 930, while the video network communications are reassembled in video assembly 928 before being played back at receiving entity 922. The state machine at receiving entity 922 can read the parameters in each of headers 902, 904, 906, 908, 910, 912, 914, and 916, and controls the reassembly of the network communications in audio assembly 930 and video assembly 928. In additional embodiments, other interleaving scheduling processes and/or efficiency processes can be implemented. The goal is to achieve an efficient mix of audio, video, and data network communications that results in a good playback that minimizes the audio or video jitter in the playback.

Figure 10:
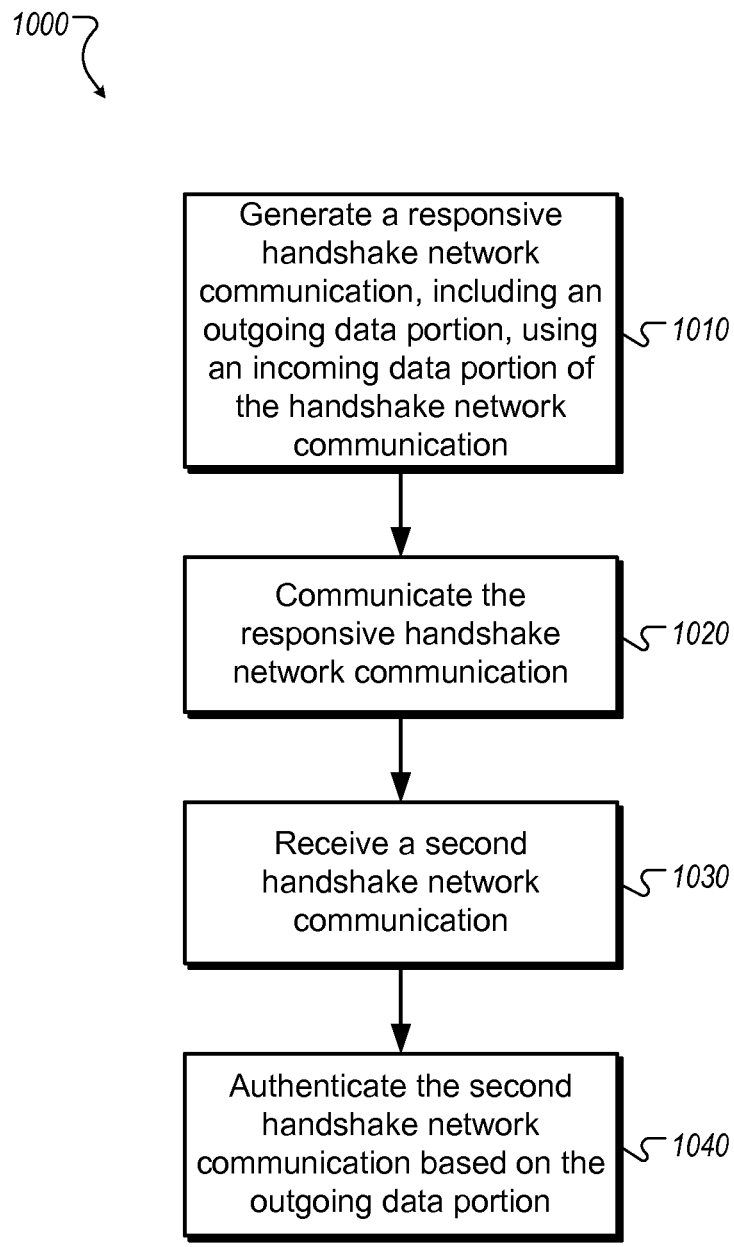
FIG. 10 shows an example process for establishing an encrypted communication session.

FIG. 10 shows an example process 1000 for establishing an encrypted communication session. A responsive handshake network communication, including an outgoing random portion, is generated 1010, using an incoming random portion from the handshake network communication. For example, the handshake network communication can be network communication 300. The authentication information 324, cryptographic information 314, random data from portions 310 and/or 320, or a combination of these can be used as a random portion. The random portion can be used to avoid replay attacks since each response is based on unique information (e.g., pseudo-random data) to the handshake network communication. Retransmitting a captured handshake network communication can result in failure to establish an encrypted communication session because the handshake network communication would not be based on a "one-time use" challenge.

The responsive handshake network communication is communicated 1020. For example, after a handshake network communication, such as network communication 300, is received, a responsive handshake network communication, similar to network communication 300, is communicated 1020 to the originator of the handshake network communication as a part of completing the encrypted communication session handshake.

A second network handshake is received 1030 in response to communicating the responsive handshake network communication. For example, the second network handshake can include a personalized response based on the outgoing random portion communicated 1020 with the generated 1010 responsive handshake network.

The second handshake network communication is authenticated 1040 based on the outgoing random portion. For example, the other party to the handshake can verify that indeed the handshake communications are associated with the present handshake attempt rather than being intercepted and subsequently retransmitted handshake communications (e.g., in a replay attack). The authentication is possible because the random data in the handshake network communications changes with each handshake communication sent or received and allows unique, one-time use.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

Storing can include any maintenance in volatile or nonvolatile memory or storage. For example, in a file system, hard drive, database, buffer, cache, random access memory (RAM), Compact Flash or Secure Digital card, or network repository.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what might be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features might be described above as acting in certain combinations and even initially claimed as such, one or more features from a claimed combination can in some cases be excised from the combination, and the claimed combination might be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing might be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. The random data need not be truly random data, but rather can be pseudo random data. Moreover, the pre-defined portion of the network communication need only be reserved for random data, but need not actually include random data in all implementations.

What is claimed is:

1. A method comprising:
at a server system, establishing, based at least in part on cryptographic information placed in a predefined portion of a handshake network communication, a communication session with a client system to stream one or more streams from the server system to the client system, the predefined portion being reserved for random data;
processing the one or more streams, wherein the processing comprises:
dividing each of the one or more streams into a plurality of network communications, wherein each network communication of the plurality of network communications has an associated data payload and an associated header, and
writing to a header of a network communication from the plurality of network communications rendering information relating to a media rendering state associated with the network communication and one or more subsequent network communications of the plurality of network communications, wherein a portion of the rendering information that remains unchanged from the network communication to the one or more subsequent network communications is written to the header of the network communication but omitted from a header of the one or more subsequent network communications, such that the headers have variable lengths; and
streaming the processed one or more streams to the client system via the established communication session.

2. The method of claim 1, wherein
if the network communication is associated with a new stream from among the one or more streams,
the method further comprises writing to a control portion of the new stream network communication a new stream network communication type identifier as a network communication type identifier, and
said writing to the header of the new stream network communication comprises writing rendering information relating to a media rendering state associated with the new stream network communication, the new stream network communication rendering information comprising a plurality of new parameter values, wherein the media rendering state associated with the new stream network communication uses no parameter values from a previous network communication of the one or more streams,
if the network communication is associated with a new media of the new stream,
the method further comprises writing to the control portion of the new media network communication a new media network communication type identifier as the network communication type identifier, and
said writing to the header of the new media network communication comprises writing rendering information relating to a media rendering state associated with the new media network communication, the new media network communication rendering information comprising a plurality of new parameter values, wherein the media rendering state associated with the new media network communication uses at least one other parameter value from a previous network communication of the new stream,
if the network communication is associated with a new time of the new stream,
the method further comprises writing to the control portion of the new time network communication a new time network communication type identifier as the network communication type identifier, and
said writing to the header of the new time network communication comprises writing rendering information relating to a media rendering state associated with the new time network communication, the new time network communication rendering information comprising at least one new parameter value, wherein the media rendering state associated with the new time network communication uses a plurality of other parameter values from a previous network communication of the new stream,
else, the method further comprises writing to the control portion of the network communication a continuation network communication type identifier as the network communication type identifier, wherein a media rendering state associated with the continuation network communication uses rendering information from one or more previous network communications, and
the parameters include one or more of a stream ID parameter, a length parameter, a media type parameter, or a time delta parameter.

3. The method of claim 1, further comprising writing, to an associated control portion of each of the plurality of network communications, an associated network communication identifier to indicate whether the associated data payload includes low-level protocol instructions or media content.

4. The method of claim 1, wherein said establishing the communication session comprises
determining a cryptographic key based at least in part on the cryptographic information, and
initiating the communication session as an encrypted communication session based at least in part on the cryptographic key.

5. The method of claim 4, further comprising encrypting, based at least in part on the cryptographic information and prior to said streaming the processed one or more streams via the encrypted communication session to the client system, data payloads of the plurality of network communications corresponding to the one or more streams.

6. The method of claim 1, wherein said establishing the communication session comprises
  generating the handshake network communication, such that the predefined portion of the handshake network communication comprises the random data and the cryptographic information,
  transmitting, to the client system, the generated handshake network communication,
  receiving, from the client system, a responsive handshake network communication, and
  authenticating the responsive handshake network communication based on the cryptographic information.

7. The method of claim 6, further comprising, in response to said authenticating of the responsive handshake communication, altering said streaming the processed one or more streams to the client system via the established communication session.

8. The method of claim 7, wherein said altered streaming comprises encrypting data payloads of the plurality of network communications corresponding to the one or more streams.

9. The method of claim 1, wherein said streaming of the processed one or more streams comprises
  queuing the plurality of network communications for transmission based on a media type of each of the plurality of network communications, said queuing including staging the plurality of network communications according to a media type of the network communication, wherein the media type comprises one of an audio format network communication, a video format network communication, or a data format network communication, and
  transmitting ones of the queued plurality of network communications based on a scheduling algorithm.

10. The method of claim 9, wherein
  said queuing further comprises
  assigning a priority to each of the processed one or more streams,
  totaling a priority for each stream,
  calculating a desired transmission rate for each of the processed one or more streams using the assigned priority and the totaled priority,
  counting a sub-total of the plurality of associated network communications transmitted per the processed one or more streams during a preset period,
  counting a total number of the plurality of associated network communications transmitted during the preset period,
  calculating an actual transmission rate for each stream of the processed one or more streams using the sub-total and the total, and
  calculating a ratio between the desired transmission rate and the actual transmission rate, and
  said transmitting the ones of the queued plurality of network communications based on the scheduling algorithm comprises
  determining a stream having a lowest calculated ratio from among the processed one or more streams,
  identifying ones of the queued plurality of network communications that are associated with the determined stream, and
  transmitting the ones identified to be associated with the determined stream from among the queued plurality of network communications.

11. A media streaming server system comprising:
  a non-transitory computer readable medium; and
  one or more hardware processors communicatively coupled with the computer readable medium,
  the non-transitory computer readable medium encoding instructions that when executed by the one or more hardware processors cause the media streaming server system to perform operations comprising:
  establishing, based at least in part on cryptographic information placed in a predefined portion of a handshake network communication, a communication session with a client system to stream one or more media streams, the predefined portion being reserved for random data,
  processing the one or more streams, wherein the processing comprises: dividing each of the one or more streams into a plurality of network communications, wherein each network communication of the plurality of network communications has an associated data payload and an associated header, and
  writing to the associated header of a network communication from the plurality of network communications rendering information relating to a media rendering state associated with the network communication and one or more subsequent network communications of the plurality of network communications, wherein a portion of the rendering information that remains unchanged from the network communication to the one or more subsequent network communications is written to the associated header of the network communication but omitted from the associated header of the one or more subsequent network communications, such that the associated header of the one or more subsequent network communications has fewer bits than the associated header of the network communication, and
  streaming the processed one or more streams to the client system via the established communication session.

12. The media streaming server system of claim 11, wherein
  if the network communication is associated with a new stream from among the one or more streams,
    the operations further comprise writing to control portion of the new stream network communication a new stream network communication type identifier as the network communication type identifier, and
    the operation of writing to the header of the new stream network communication comprises writing rendering information relating to a media rendering state associated with the new stream network communication, the new stream network communication rendering information comprising a plurality of new parameter values, wherein the media rendering state associated with the new stream network communication uses no parameter values from a previous network communication of the one or more streams,
  if the network communication is associated with a new media of the new stream,
    the operations further comprise writing to the control portion of the new media network communication a new media network communication type identifier as the network communication type identifier, and
    the operation of writing to the header of the new media network communication comprises writing rendering information relating to a media rendering state associated with the new media network communication, the new media network communication rendering information comprising a plurality of new parameter values, wherein the media rendering state associated with the new media network communication uses at least one other parameter value from a previous network communication of the new stream, if the network communication is associated with a new time of the new stream, the operations further comprise writing to the control portion of the new time network communication a new time network communication type identifier as the network communication type identifier, and the operation of writing to the header of the new time network communication comprises writing rendering information relating to a media rendering state associated with the new time network communication comprising, the new time network communication rendering information comprising at least one new parameter value, wherein the media rendering state associated with the new time network communication uses a plurality of other parameter values from a previous network communication of the new stream, else, the operations further comprise writing to the control portion of the network communication a continuation network communication type identifier as the network communication type identifier, wherein a media rendering state associated with the continuation network communication uses rendering information from one or more previous network communications, and the parameters include one or more of a stream ID parameter, a length parameter, a media type parameter, or a time delta parameter.

13. The media streaming server system of claim 11, wherein the operations further comprise writing, to an associated control portion of each of the plurality of network communications, an associated network communication identifier to indicate whether the associated data payload includes low-level protocol instructions or media content.

14. The media streaming server system of claim 11, wherein the operation of establishing the communication session comprise, determining a cryptographic key based at least in part on the cryptographic information, and initiating the communication session as an encrypted communication session based at least in part on the cryptographic key.

15. The media streaming server system of claim 14, wherein the operations further comprise encrypting, based at least in part on the cryptographic information and prior to said streaming the processed one or more streams via the encrypted communication session to the client system, data payloads of the plurality of network communications corresponding to the one or more streams.

16. The media streaming server system of claim 11, wherein the operation of establishing the communication session comprises generating the handshake network communication, such that the predefined portion of the handshake network communication comprises the random data and the cryptographic information, transmitting, to the client system, the generated handshake network communication, receiving, from the client system, a responsive handshake network communication, and authenticating the responsive handshake network communication based on the cryptographic information.

17. The media streaming server system of claim 16, wherein the operations further comprise, in response to said authenticating of the responsive handshake communication, altering said streaming the processed one or more streams to the client system via the established communication session.

18. The media streaming server system of claim 17, wherein the operation of altered streaming comprises encrypting data payloads of the plurality of network communications corresponding to the one or more streams.

19. The media streaming server system of claim 11, wherein the operation of streaming the processed one or more streams comprises queuing the plurality of network communications for transmission based on a media type of each of the plurality of network communications, the operation of queuing including staging the plurality of network communications according to a media type of the network communication, wherein the media type comprises one of an audio format network communication, a video format network communication, or a data format network communication, and transmitting ones of the queued plurality of network communications based on a scheduling algorithm.

20. The media streaming server system of claim 19, wherein the operation of queuing further comprises assigning a priority to each of the processed one or more streams, totaling a priority for each stream, calculating a desired transmission rate for each of the processed one or more streams using the assigned priority and the totaled priority, counting a sub-total of the plurality of associated network communications transmitted per the processed one or more streams during a preset period, counting a total number of the plurality of associated network communications transmitted during the preset period, calculating an actual transmission rate for each stream of the processed one or more streams using the sub-total and the total, and calculating a ratio between the desired transmission rate and the actual transmission rate, and the operation of transmitting the ones of the queued plurality of network communications based on the scheduling algorithm comprises determining a stream having a lowest calculated ratio from among the processed one or more streams, identifying ones of the queued plurality of network communications that are associated with the determined stream, and transmitting the ones identified to be associated with the determined stream from among the queued plurality of network communications.

21. A non-transitory computer-readable medium encoding instructions that when executed by data processing apparatus cause the data processing apparatus to perform operations comprising:

establishing, based at least in part on cryptographic information placed in a predefined portion of a handshake network communication, a communication session with a client system to stream one or more media streams, the predefined portion being reserved for random data; processing the one or more streams, wherein the processing comprises:

dividing each of the one or more streams into a plurality of network communications, wherein each network communication of the plurality of network communications has an associated data payload and an associated header, and writing to a header of a network communication from the plurality of network communications rendering information comprising all new parameter values with respect to a previous network communication and relating to a media rendering state associated with the network communication and one or more subsequent network communications of the plurality of network communications, wherein a portion of the rendering information that remains unchanged from the network communication to the one or more subsequent network communications is written to the header of the network communication but omitted from a header of the one or more subsequent network communications, such that the headers have variable lengths; and writing to a control portion of the network communication a new stream network communication type identifier as a network communication type identifier;

streaming the processed one or more streams to the client system via the established communication session.

22. The non-transitory computer-readable medium of claim 21, wherein the operations further comprise writing, to an associated control portion of each of the plurality of network communications, an associated network communication identifier to indicate whether the associated data payload includes low-level protocol instructions or media content.

23. The non-transitory computer-readable medium of claim 21, wherein the operation of establishing the communication session comprise, determining a cryptographic key based at least in part on the cryptographic information, and initiating the communication session as an encrypted communication session based at least in part on the cryptographic key.

24. The non-transitory computer-readable medium of claim 23, wherein the operations further comprise encrypting, based at least in part on the cryptographic information and prior to said streaming the processed one or more streams via the encrypted communication session to the client system, data payloads of the plurality of network communications corresponding to the one or more streams.

25. The non-transitory computer-readable medium of claim 21, wherein the operation of establishing the communication session comprises generating the handshake network communication, such that the predefined portion of the handshake network communication comprises the random data and the cryptographic information, transmitting, to the client system, the generated handshake network communication, receiving, from the client system, a responsive handshake network communication, and authenticating the responsive handshake network communication based on the cryptographic information.

26. The non-transitory computer-readable medium of claim 25, wherein the operations further comprise, in response to said authenticating of the responsive handshake communication, altering said streaming the processed one or more streams to the client system via the established communication session.

27. The non-transitory computer-readable medium of claim 26, wherein the operation of altered streaming comprises encrypting data payloads of the plurality of network communications corresponding to the one or more streams.

28. The non-transitory computer-readable medium of claim 21, wherein the operation of streaming the processed one or more streams comprises queuing the plurality of network communications for transmission based on a media type of each of the plurality of network communications, the operation of queuing including staging the plurality of network communications according to a media type of the network communication, wherein the media type comprises one of an audio format network communication, a video format network communication, or a data format network communication, and transmitting ones of the queued plurality of network communications based on a scheduling algorithm.

29. The non-transitory computer-readable medium of claim 28, wherein the operation of queuing further comprises assigning a priority to each of the processed one or more streams, totaling a priority for each stream, calculating a desired transmission rate for each of the processed one or more streams using the assigned priority and the totaled priority, counting a sub-total of the plurality of associated network communications transmitted per the processed one or more streams during a preset period, counting a total number of the plurality of associated network communications transmitted during the preset period, calculating an actual transmission rate for each stream of the processed one or more streams using the sub-total and the total, and calculating a ratio between the desired transmission rate and the actual transmission rate, and the operation of transmitting the ones of the queued plurality of network communications based on the scheduling algorithm comprises determining a stream having a lowest calculated ratio from among the processed one or more streams, identifying ones of the queued plurality of network communications that are associated with the determined stream, and transmitting the ones identified to be associated with the determined stream from among the queued plurality of network communications.

* * * * *